(12) United States Patent
Bao et al.

(10) Patent No.: US 8,315,308 B2
(45) Date of Patent: Nov. 20, 2012

(54) VIDEO CODING WITH FINE GRANULARITY SPATIAL SCALABILITY

(75) Inventors: Yiliang Bao, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1549 days.

(21) Appl. No.: 11/506,348

(22) Filed: Aug. 18, 2006

(65) Prior Publication Data

US 2007/0160133 A1    Jul. 12, 2007

Related U.S. Application Data

(60) Provisional application No. 60/758,323, filed on Jan. 11, 2006.

(51) Int. Cl.
*H04N 11/02* (2006.01)
(52) U.S. Cl. .............................. 375/240.12; 375/240.24
(58) Field of Classification Search ............... 375/240.1, 375/240.12, 240.24
See application file for complete search history.

(56) References Cited

U.S. PATENT DOCUMENTS

| | | | | |
|---|---|---|---|---|
| 5,475,435 | A * | 12/1995 | Yonemitsu et al. | 348/426.1 |
| 6,614,936 | B1 | 9/2003 | Wu et al. | |
| 7,492,950 | B2 * | 2/2009 | Suzuki et al. | 382/232 |
| 7,684,489 | B2 * | 3/2010 | Johansen et al. | 375/240.18 |
| 7,903,735 | B2 * | 3/2011 | Cha et al. | 375/240.12 |
| 2006/0104354 | A1 * | 5/2006 | Han et al. | 375/240.03 |
| 2006/0120450 | A1 * | 6/2006 | Han et al. | 375/240.03 |
| 2006/0133482 | A1 * | 6/2006 | Park et al. | 375/240.08 |
| 2006/0133484 | A1 * | 6/2006 | Park et al. | 375/240.08 |
| 2010/0165077 | A1 * | 7/2010 | Yin et al. | 348/42 |
| 2010/0246674 | A1 * | 9/2010 | Park et al. | 375/240.13 |

FOREIGN PATENT DOCUMENTS

| | | | |
|---|---|---|---|
| JP | 6153183 | A | 5/1994 |
| JP | 2005507589 | A | 3/2005 |
| JP | 2006005438 | A | 1/2006 |
| JP | 2006511164 | A | 3/2006 |

(Continued)

OTHER PUBLICATIONS

International Search Report and Written Opinion—PCT/US2007/060424, International Search Authority—European Patent Office—Feb. 5, 2007.

(Continued)

*Primary Examiner* — Sath V Perungavoor
*Assistant Examiner* — Christopher Findley
(74) *Attorney, Agent, or Firm* — Timothy F. Loomis; Elaine Lo

(57) ABSTRACT

The disclosure is directed to video coding techniques that support spatial scalability using a generalized fine granularity scalability (FGS) approach. Various degrees of spatial scalability can be achieved by sending spatially scalable enhancement layers in a generalized FGS format. Spatially scalable enhancement bitstreams can be arbitrarily truncated to conform to network conditions, channel conditions and/or decoder capabilities. Coding coefficients and syntax elements for spatial scalability can be embedded in a generalized FGS format. For good network or channel conditions, and/or enhanced decoder capabilities, additional bits received via one or more enhancement layers permit encoded video to be reconstructed with increased spatial resolution and continuously improved video quality across different spatial resolutions. The techniques permit spatial scalability layers to be coded as FGS layers, rather than discrete layers, permitting arbitrary scalability. The techniques may include features to curb error propagation that may otherwise arise due to partial decoding.

37 Claims, 14 Drawing Sheets

FOREIGN PATENT DOCUMENTS

| | | |
|---|---|---|
| JP | 2006295913 A | 10/2006 |
| JP | 2007174285 A | 7/2007 |
| JP | 2007532063 A | 11/2007 |
| JP | 2008522537 A | 6/2008 |
| KR | 1020050082102 | 8/2005 |
| WO | WO2004057866 A2 | 7/2004 |

OTHER PUBLICATIONS

Radha H et al. "Scalable Internet video using MPEG-4," Signal Processing. Image Communication, Elsevier Science Publishers, Amsterdam, NL, vol. 15, No. 1-2, Sep. 1999, pp. 95-126.

Peng Zhang et al. "Multiple modes intra-prediction in intra coding," Multimedia and Expo, 2004. ICME '04. 2004 IEEE International Conference on Taipei, Taiwan Jun. 27-30, 2004, Piscataway, NJ, USA, IEEE, vol. 1, Jun. 27, 2004, pp. 419-422.

Mihaela Van Der Schaar: "All FGS temporal-SNR-spatial scalability", ITU Study.

Group 16—Video Coding Experts Group—1SOIIEC MPEG & ITU-T VCEG(ISO1IEC JTCI/SC29/WGII and ITU-T SG16 Q6), XX, XX, No. M6490, Oct. 17, 2000, XP030035640.

* cited by examiner

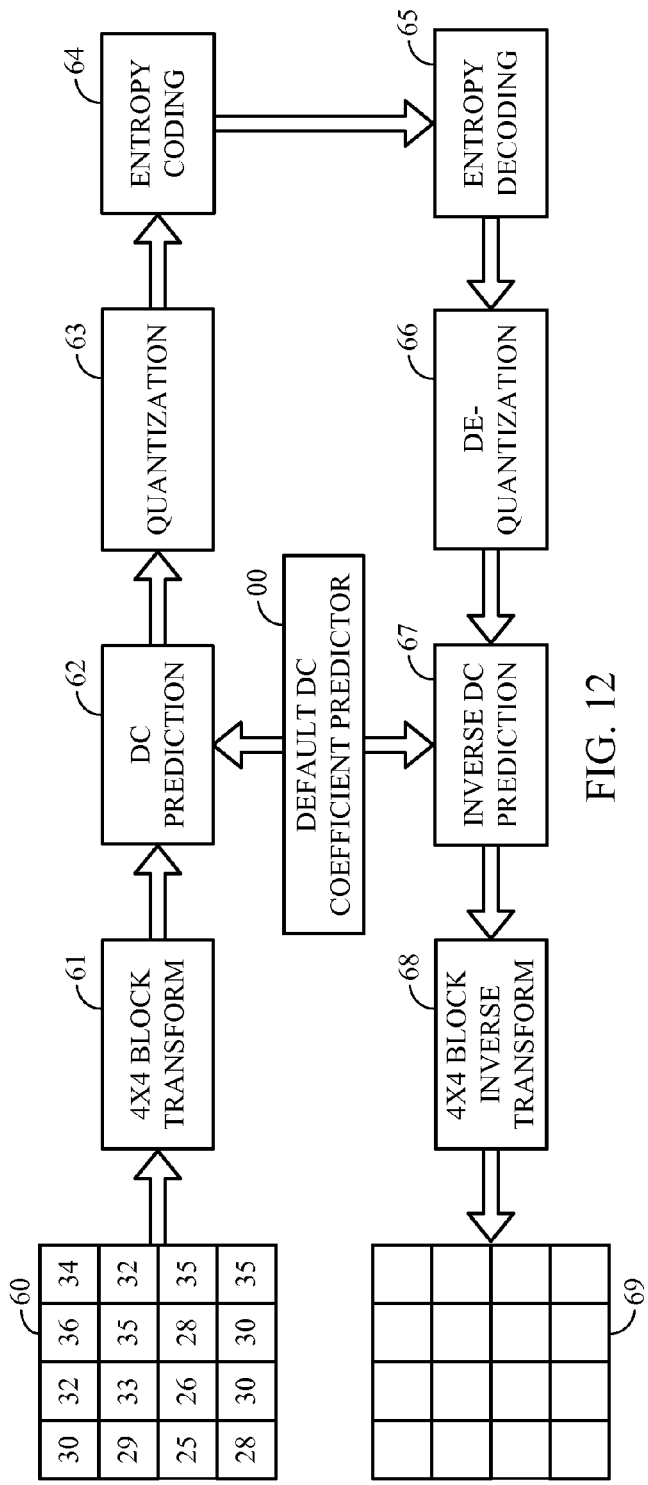
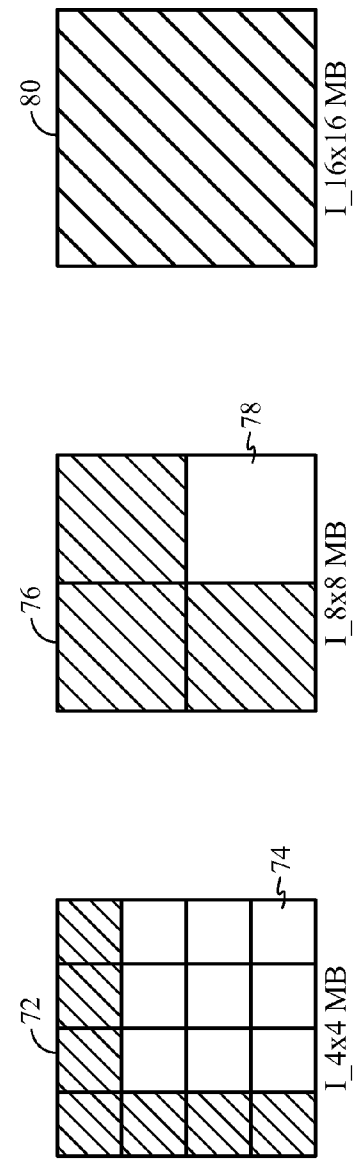
FIG. 12
FIG. 13

VIDEO CODING WITH FINE GRANULARITY SPATIAL SCALABILITY

RELATED APPLICATION

This application claims priority to U.S. Provisional Application No. 60/758,323 filed Jan. 11, 2006 entitled VIDEO CODING WITH GENERIC FINE GRANULARITY SCALABILITY.

TECHNICAL FIELD

This disclosure relates to video and, more particularly, coding of digital video.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones and the like. Digital video devices can provide significant improvements over conventional analog video systems in efficiently creating, modifying, transmitting, storing, recording and playing motion video sequences.

Fine granularity scalability (FGS) generally refers to the ability to arbitrarily truncate a video bitstream to achieve graceful degradation of video quality within a given bit rate range. An FGS-encoded video bitstream includes a base layer of a specified quality, and one or more enhancement layers that are linked to the base layer. The enhancement layers include additional data to refine the quality of the base layer. As more of the FGS bitstream is received and decoded, via one or more enhancement layers, the quality of the decoded video improves.

SUMMARY

In general, the disclosure is directed to video coding techniques that support spatial scalability using a generalized fine granularity scalability (FGS) approach. According to this disclosure, various degrees of spatial scalability can be achieved by sending spatially scalable enhancement layers in a generalized FGS format. The spatial scalability layers can be coded as FGS enhancement layers, rather than discrete enhancement layers, permitting spatial scalability with continuously improved video quality.

The video coding techniques may be supplemented by one or more features to reduce error propagation that may otherwise arise due to partial decoding. For example, the video coding techniques may apply a leaky prediction scheme for intra-frame prediction to reduce drifting error, a special DC mode for intra blocks to reduce spatial error propagation, and a constraint of using only the pixels in the base layer for intra prediction.

The coefficients and syntax elements necessary for reconstructing the spatial scalability enhancement layer can be embedded in a generalized FGS format. Additional bits received via enhancement layers permit encoded video to be reconstructed with increased spatial resolution and continuously improved video quality across different spatial resolutions. Spatially scalable enhancement bitstreams can be arbitrarily truncated at any point to conform to network or channel conditions, or to conform to decoder capabilities.

In one embodiment, the disclosure provides a video coding method comprising decoding a fine granularity scalability (FGS) base layer to reconstruct a base layer video block defining video at a first spatial resolution, at least partially decoding one or more FGS enhancement layers to reconstruct an enhancement layer video block defining video at a second spatial resolution greater than or equal to the first spatial resolution, and predicting an intra-coded video block based on a weighted sum of a first prediction block formed from the base layer video block and a second prediction block formed from neighboring pixels in the enhancement layer video block. In some embodiments, the second spatial resolution is greater than the first spatial resolution, and the method further comprises upsampling the base layer video block, in which case the first prediction block is formed from the upsampled base layer video block.

In another embodiment, the disclosure provides a video coding device including a decoder that decodes a fine granularity scalability (FGS) base layer to reconstruct a base layer video block defining video at a first spatial resolution, at least partially decodes one or more FGS enhancement layers to reconstruct an enhancement layer video block defining video at a second spatial resolution greater than or equal to the first spatial resolution, and predicts an intra-coded video block based on a weighted sum of a first prediction block formed from the base layer video block and a second prediction block formed from neighboring pixels in the enhancement layer video block. In some embodiments, the second spatial resolution is greater than the first spatial resolution, and the decoder upsamples the base layer video block, in which case the first prediction block is formed from the upsampled base layer video block.

In an additional embodiment, the disclosure provides a method comprising decoding a fine granularity scalability (FGS) base layer including base layer video blocks defining video information at a first spatial resolution, at least partially decoding one or more FGS enhancement layers including enhancement layer video blocks defining video information at a second spatial resolution greater than the first spatial resolution, and predicting intra-coded video blocks without using video information derived from the same frame in the same layer.

In another embodiment, the disclosure provides a device comprising a decoder that decodes a fine granularity scalability (FGS) base layer including base layer video blocks defining video information at a first spatial resolution, at least partially decodes one or more FGS enhancement layers including enhancement layer video blocks defining video information at a second spatial resolution greater than the first spatial resolution, and predicts intra-coded video blocks without using video information derived from the same frame in the same layer.

In a further embodiment, the disclosure provides a method comprising decoding a fine granularity scalability (FGS) base layer including base layer video blocks defining video information at a first spatial resolution, decoding one or more FGS enhancement layers including enhancement layer video blocks defining video information at a second spatial resolution greater than the first spatial resolution, and decoding some blocks in the FGS enhancement layers using a special DC mode in which a DC coefficient is predicted from a default value known to both an encoder and a decoder and AC coefficients are decoded without a prediction calculated from neighboring blocks.

In another embodiment, the disclosure provides a device comprising a decoder that decodes a fine granularity scalability (FGS) base layer including base layer video blocks defining video information at a first spatial resolution, encodes one or more FGS enhancement layers including enhancement layer video blocks defining video information at a second spatial resolution greater than the first spatial resolution, and decoding some blocks in the FGS enhancement layers using a special DC mode in which a DC coefficient is predicted from a default value known to both an encoder and a decoder and AC coefficients are decoded without a prediction calculated from neighboring blocks.

The techniques described in this disclosure may be implemented in a hardware, software, firmware, or any combination thereof. If implemented in software, the software may be executed in a processor, such as a digital signal processor (DSP). The software that executes the techniques may be initially stored in a computer readable medium and loaded and executed in the processor. Accordingly, this disclosure also contemplates a computer readable medium comprising instructions to perform techniques for achieving spatial scalability using a generalized FGS approach.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 12 is a diagram illustrating application of a special DC mode to a video block.

FIG. 13 is a diagram illustrating use of the special DC mode of FIG. 12 for different intra prediction modes.

DETAILED DESCRIPTION

Figure 1:
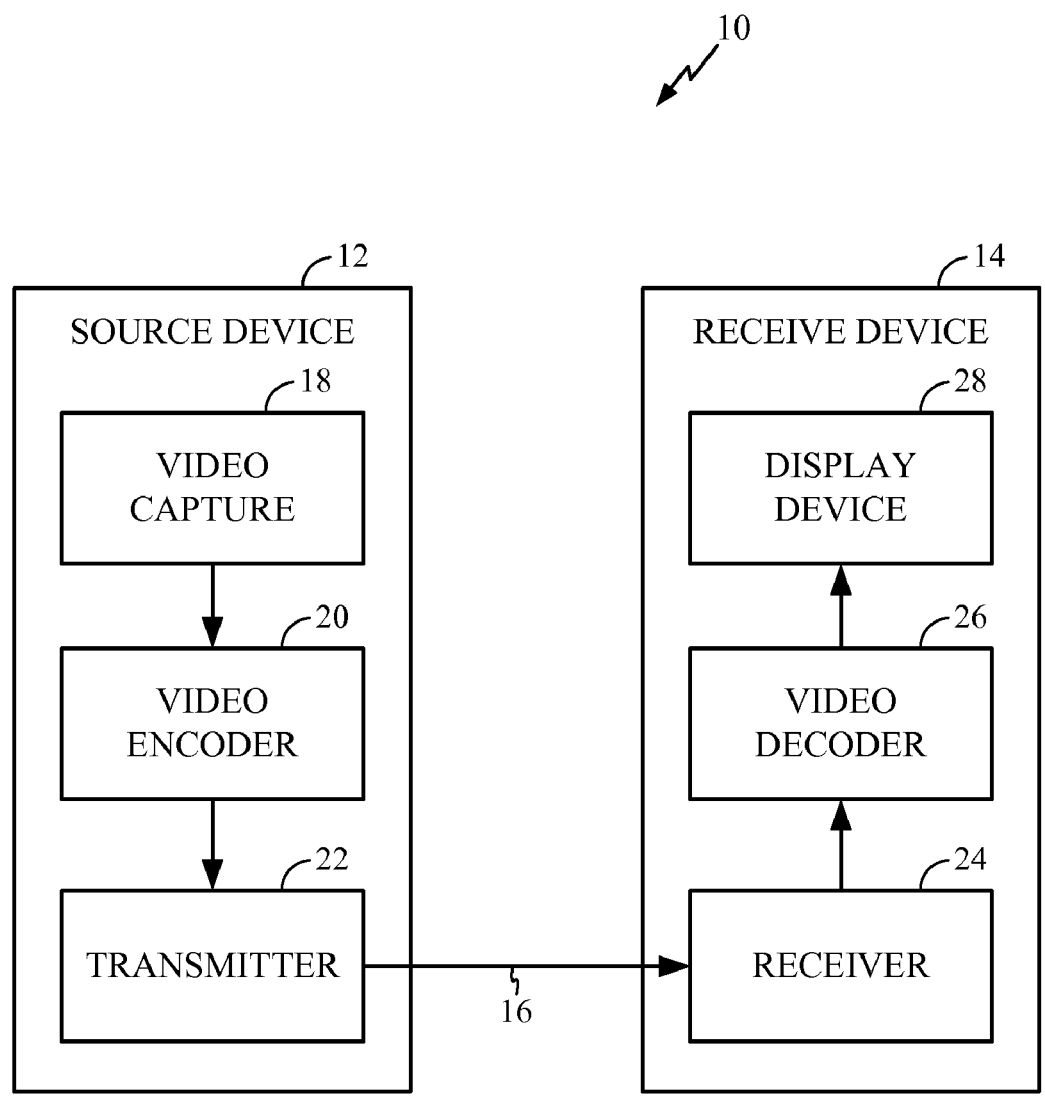
FIG. 1 is a block diagram illustrating a video encoding and decoding system.

FIG. 1 is a block diagram illustrating a video encoding and decoding system 10. System 10 is configured to apply video coding techniques that support spatial scalability using a generalized fine granularity scalability (FGS) approach. As shown in FIG. 1, system 10 includes a source device 12 that transmits encoded video to a receive device 14 via a channel 16. Source device 12 may include a video capture device 18, video encoder 20 and a transmitter 22. Receive device 14 may include a receiver 24, video decoder 26 and video display device 28.

In system 10, various degrees of spatial scalability can be achieved by sending spatially scalable enhancement layers in a generalized FGS format, instead of relying on decoding of discrete enhancement layers. A base layer carries a video sequence with a minimum level of quality. An enhancement layer carries additional bitstream to support higher quality levels. In addition, in accordance with this disclosure, the additional bitstream carried by one or more enhancement layers support increased spatial scalability.

Video encoder 20 and video decoder 26 are configured to provide spatially scalable enhancement bitstreams that can be arbitrarily truncated. Additional bits received via one or more enhancement layers permit encoded video to be reconstructed with increased spatial resolution and continuously improved video quality across different spatial resolutions as permitted by applicable network conditions, channel conditions and/or decoder capabilities.

As will be described, system 10 may apply various schemes to reduce drifting error that can result from partial decoding of enhancement layers. The coefficients and syntax elements necessary for reconstructing the spatial scalability enhancement layer can be embedded in a generalized FGS format. With a generalized FGS format, and suitable drift error control schemes, spatial resolution can be increased or decreased with continuous quality improvement or gradual quality degradation, depending on system conditions.

System 10 can avoid the use of discrete enhancement layers that must be coded in their entirety in order to achieve spatial scalability. In some embodiments, however, system 10 may be configured to support spatial scalability using either a generalized FGS approach or discrete enhancement layers, e.g., on a selective basis.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 may be any digital video device capable of encoding and transmitting video data. Video capture device 18 captures video sequences and stores the captured sequences in memory (not shown) for access by video encoder 20. Video capture device 18 may be a video camera, a video archive, or a video converter that converts analog video data to digital video data, e.g., from a television, video disc recorder, video cassette recorder, camcorder, or another video device. In each case, video encoder 20 encodes the captured video for efficient transmission to receive device 14.

Source device 12 may be configured to transmit archived or real-time video sequences over communication channel 16. For real-time video sequences, source device 12 and receive device 14 may be configured to support real-time, two-way video telephony (VT) and/or real-time, one-way video streaming. For non-real-time video streaming, source device 12 and receive device 14 may support applications such as video clip playback or video mail and include appropriate control media, such as play, pause, forward, and reverse buttons.

Video encoder 20 and decoder 26 may include a variety of hardware, software and/or firmware suitable for encoding video obtained by video capture device 18. Video encoder 18 may include one or more digital signal processors (DSPs) that execute programmable software modules for video encoding. Associated memory and logic circuitry may be provided to support the DSP in controlling the video encoding process. In some embodiments, video encoder 18 may form part of a combined video encoder-decoder (CODEC).

Video encoder 20 and video decoder 26 may be configured to apply one or more encoding techniques, such as techniques generally conforming to the MPEG-1, MPEG-2, MPEG-4, ITU-T H.263, or ITU-T H.264 standards, or other standards. As a particular example, video encoder 20 and decoder 26 may conform to the ITU-T H.264/MPEG-4 Part 10, i.e., Advanced Video Coding (AVC), digital video codec standard, which was formulated by the ITU-T Video Coding Experts Group (VCEG) together with the ISO/IEC Moving Picture Experts Group (MPEG) as the product of a collective partnership effort known as the Joint Video Team (JVT). The ITU-T H.264 standard and the ISO/IEC MPEG-4 Part 10 standard are technically identical.

Currently, the Joint Video Team (JVT) is working on a scalable video coding (SVC) extension to H.264/AVC. The specification of both H.264/AVC and the evolving SVC extension is in the form of a Joint Draft (JD). The Joint Scalable Video Model (JSVM) created by JVT implements tools for use in scalable video, and may be used with system 10 for various coding tasks described in this disclosure. JSVM supports various scalability features. Detailed information concerning Fine Granularity SNR Scalability (FGS) coding can be found in the Joint Draft. However, some of the basic concepts and unique properties of FGS will be described herein for purposes of illustration.

A video sequence includes a series of video frames. Video encoder 20 operates on blocks of pixels within individual video frames in order to encode the video data. The video blocks may have fixed or varying sizes, and may differ in size according to a specified coding standard. As an example, the ITU-T H.264 standard supports intra prediction in various block sizes, such as 16 by 16, 8 by 8, 4 by 4 for luma component, and 8×8 for chroma component, as well as inter prediction in various block sizes, such as 16 by 16, 16 by 8, 8 by 16, 8 by 8, 8 by 4, 4 by 8 and 4 by 4 for luma component and corresponding scaled sizes for chroma components. Smaller video blocks can provide better resolution, and may be used for locations of a video frame that include higher levels of detail. After the prediction, a transform may be performed on the 8×8 residual block or 4×4 residual block, and additional an transform may be applied to the DC coefficients of the 4×4 blocks for chroma components or luma component if the intra__16×16 prediction mode is used.

With further reference to FIG. 1, transmitter 22 may include appropriate modem and driver circuitry to transmit encoded video over channel 16, which may be wired or wireless, or include a combination of wired and wireless media. For wireless applications, transmitter 22 includes RF circuitry to transmit wireless data carrying the encoded video data. In some embodiments, source device 12 may take the form of one or more servers, workstations, desktop computers, mobile computers, personal digital assistants (PDAs), wireless radiotelephones, satellite telephones, or other wired or wireless communication devices.

In receive device 14, video decoder 26 may form part of a CODEC, like video encoder 20 of source device 12. Receive device 14 may take the form of any digital video device or combination of devices capable of receiving and decoding video data, such as one or more workstations, desktop computers, mobile computers, personal digital assistants (PDAs), wireless radiotelephones, satellite telephones, or other wired or wireless communication devices.

Like transmitter 22, receiver 24 may include appropriate modem and driver circuitry to receive encoded video over channel 16, and may include RF circuitry to receive wireless data carrying the encoded video data in wireless applications. In some embodiments, source device 12 and receive device 14 each may include reciprocal transmit and receive circuitry so that each may serve as both a source device and a receive device for encoded video and other information transmitted over channel 16. In this case, both source device 12 and receive device 14 may encode, transmit, receive and decode video sequences.

Display device 28 may be any suitable device for presenting video to a user, such as an LCD or plasma flat panel display, a cathode ray tube (CRT) display, or any other display. In addition, display device 28 may be integrated with receive device 14 or provided as a discrete device coupled to receive device 14 via a wired or wireless connection. Display device 28 also may serve as part of a user interface for receive device 14. Source device 12 also may include a display device to permit viewing of received video and user interaction with source device 12.

Encoder 20 and decoder 26 are configured to support fine granularity scalability (FGS). FGS permits a bitstream to be almost arbitrarily truncated within a certain bit rate range. One form of FGS is applied to signal-to-noise ratio (SNR) scalability. A common scenario involves encoding a video bitstream with a base layer having a certain level of quality, and one or more FGS enhancement layers that offer refinement to the base layer at the same resolution. For example, with a base layer coded for common intermediate format (CIF) resolution, the transmission of additional bitstream through FGS enhancement layers improves the quality, e.g., SNR, of the CIF resolution video.

In accordance with this disclosure, FGS is exploited to support spatial scalability via one or more enhancement layers transmitted according to a generalized FGS approach. For example, a base layer coded in quarter common intermediate format (QCIF) resolution can be augmented by one or more FGS enhancement layers that include additional bitstream to enhance the spatial resolution of the video, e.g., from QCIF resolution to CIF resolution. The spatial scalability FGS enhancement layers also may include additional bitstream sufficient to enhance the quality of the video for the QCIF and/or CIF resolution. Hence, the generalized FGS approach described in this disclosure supports spatial scalability, but also may support SNR scalability. Notably, encoder 20 and decoder 26 are configured to alleviate drifting error that may result from partial decoding of one or more enhancement layers.

Figure 2:
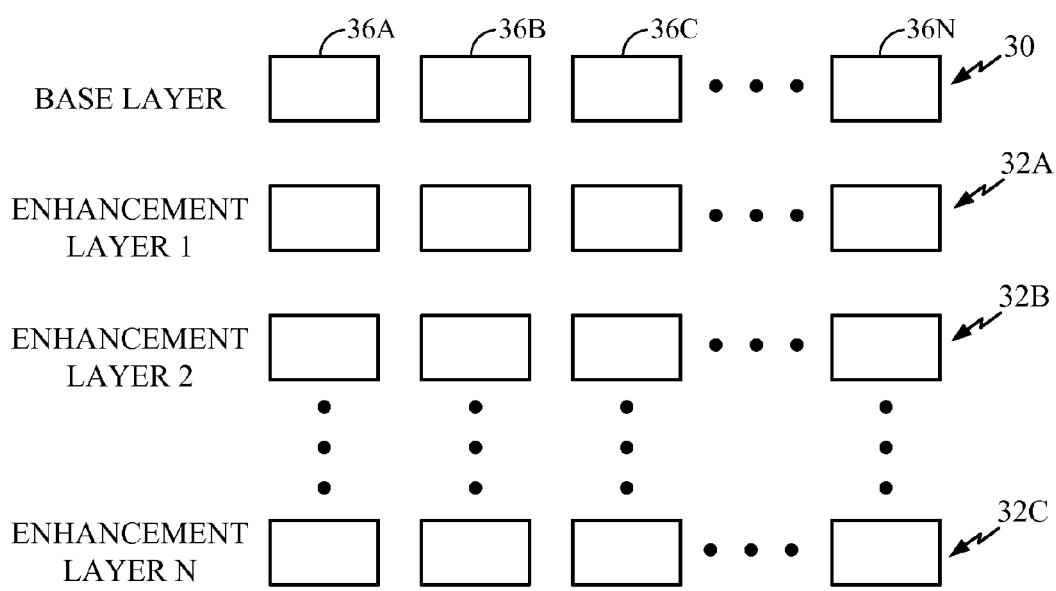
FIG. 2 is a diagram illustrating multi-layer FGS encoding of a video bitstream.

FIG. 2 is a diagram illustrating multi-layer FGS encoding of a video bitstream. As shown in FIG. 2, FGS encoding of a video bitstream results in a base layer 30 and one or more enhancement layers 32A-32N (collectively layers 32). Base layer 30 includes a series of frames 36A-36N that encode the video bitstream with a minimum level of quality for a given bit rate. Each of enhancement layers 32 provides additional video bitstream information that can be used by a decoder 26 to progressively increase the initial quality provided by base layer 30. The number of enhancement layers 32 processed by decoder 26 depends on the number of enhancement layers transmitted by source device 14, e.g., given channel conditions or other limitations, and the number of received enhancement layers that are processed by decoder 26.

In general, each respective enhancement layer 32A-32N, or portions thereof, that is processed by decoder 26 adds incrementally to the quality of the video obtained from base layer 30, in terms of SNR and/or spatial resolution, in accordance with this disclosure. Instead of processing each enhancement layer 32A-32N in its entirety as a discrete enhancement layer, this disclosure contemplates a system 10 that permits spatial scalability enhancement layers to be coded, transmitted and processed using a generalized FGS approach. In this manner, spatial resolution can be scaled with fine granularity, offering continuous quality improvements upon partial decoding of spatial enhancement layers. As will be described, partial decoding may present error propagation issues that can be addressed using one or more schemes also presented in this disclosure.

Figure 3:
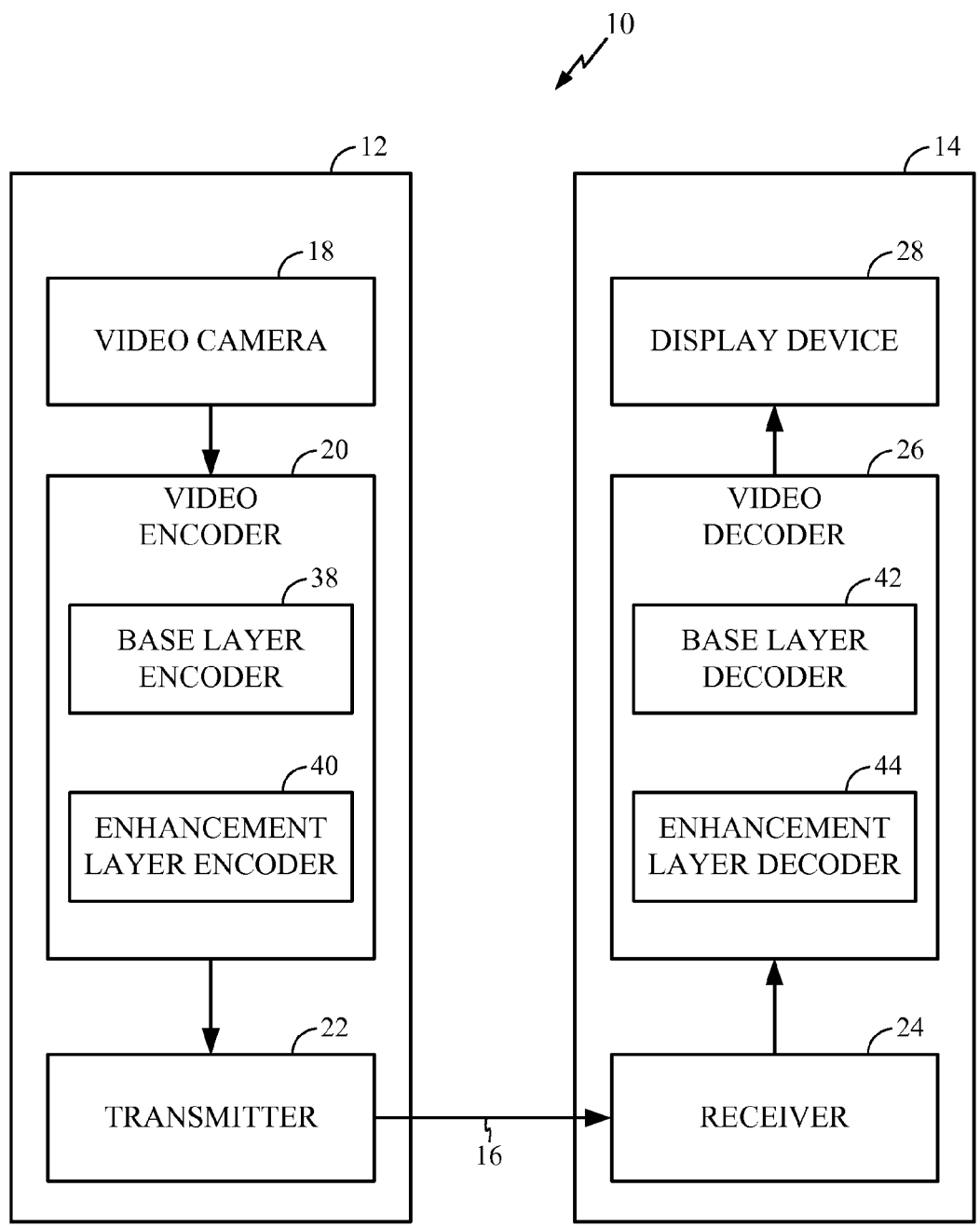
FIG. 3 is a block diagram illustrating the system of FIG. 1 in further detail, including base layer and enhancement layer encoders and decoders.

FIG. 3 is a block diagram illustrating system 10 of FIG. 1 in further detail, including base layer and enhancement layer encoders and decoders. In particular, in the example of FIG. 3, video encoder 20 includes a base layer encoder 38 and an enhancement layer encoder 40. Video decoder 26 includes a base layer decoder 42 and an enhancement layer decoder 44. Devices 12 and 14 otherwise generally conform to FIG. 1. Again, source device 12 and receive device 14 may each include reciprocal transmit/receive and encode/decode components. Like FIG. 1, however, FIG. 3 presents one device 12 as a source/encoding device and the other device 14 as a receive/decoding device for ease of illustration.

Base layer encoder 38 encodes at least a portion of video bitstream obtained from video camera 18 to provide a minimum level of quality and/or a minimum spatial size for a given bit rate. Enhancement layer encoder 40 encodes additional portions of the video bitstream to produce enhancement layers that, if decoded, provide added quality and/or permit one or more larger spatial formats. The enhancement layers may be hierarchical in the sense that the layers offer progressively increasing quality as they are decoded. Decoding of all enhancement layers, for example, will produce maximum quality and largest spatial size, while decoding of only a first enhancement layer will produce an incremental increase in quality relative to the decoding of only the base layer.

The enhancement layers may permit spatial scalability from a first size to a second size with increasing image frame quality. Alternatively, in some embodiments, the enhancement layers may permit spatial scalability from a first size to a second size, from the second size to a third size, and possibly from the third size to one or more larger sizes. For example, the enhancement layers may permit a video frame or sequence to be scaled only from QCIF to CIF, or only from CIF to VGA (video graphics array), or only from VGA to SVGA (super VGA). Alternatively, the enhancement layers may permit the video to be scaled from QCIF to CIF, from CIF to VGA, and from VGA to SVGA. Although QCIF, CIF, VGA and SVGA are mentioned for purposes of illustration, other spatial sizes and formats are possible as alternatives or additions.

In operation, base layer decoder 42 decodes the base layer received via channel 16 to produce a portion of the video bitstream obtained by video camera 18 for presentation on display device 28. Enhancement layer decoder 44 increases the quality of the decoded video by decoding one or more enhancement layers, if available. Again, the number of enhancement layers received by receive device 14 may depend on channel conditions or other limitations. In addition, the number of received enhancement layers processed by enhancement layer decoder 44 may depend on decoder limitations. In general, the encoding and decoding of the base layer, in combination with a selected number of enhancement layers, permits incremental improvement in the SNR quality of the decoded video.

In addition to SNR scalability, it is also desirable to provide spatial scalability. In accordance with this disclosure, system 10 is configured to support spatial scalability via a generalized FGS coding approach. As will be described, system 10 can achieve spatial scalability, in part, by interleaving coded coefficients and syntax elements for different video blocks in cycles to ensure that each enhancement layer in multi-layer FGS-encoded video uniformly improves the video quality of a base layer.

Partial decoding to achieve spatial scalability via FGS may produce errors. For this reason, system 10 may apply one or more methods for curbing error propagation, including leaky prediction in intra-frame prediction to reduce drifting, a special DC mode for intra blocks to reduce spatial error propagation, and the constraint of using only the pixels in the base layer for intra prediction. System 10 may send syntax elements describing how an enhancement layer should be predicted, e.g., whether it is inter- or intra-predicted and how the block was partitioned. System 10 also may support either FGS spatial scalability or discrete spatial scalability on a selective basis. In other words, system 10 may support and transition between FGS spatial scalability and scalability via discrete enhancement layers based on network conditions, channel conditions, decoder capabilities or other considerations.

Figure 4:
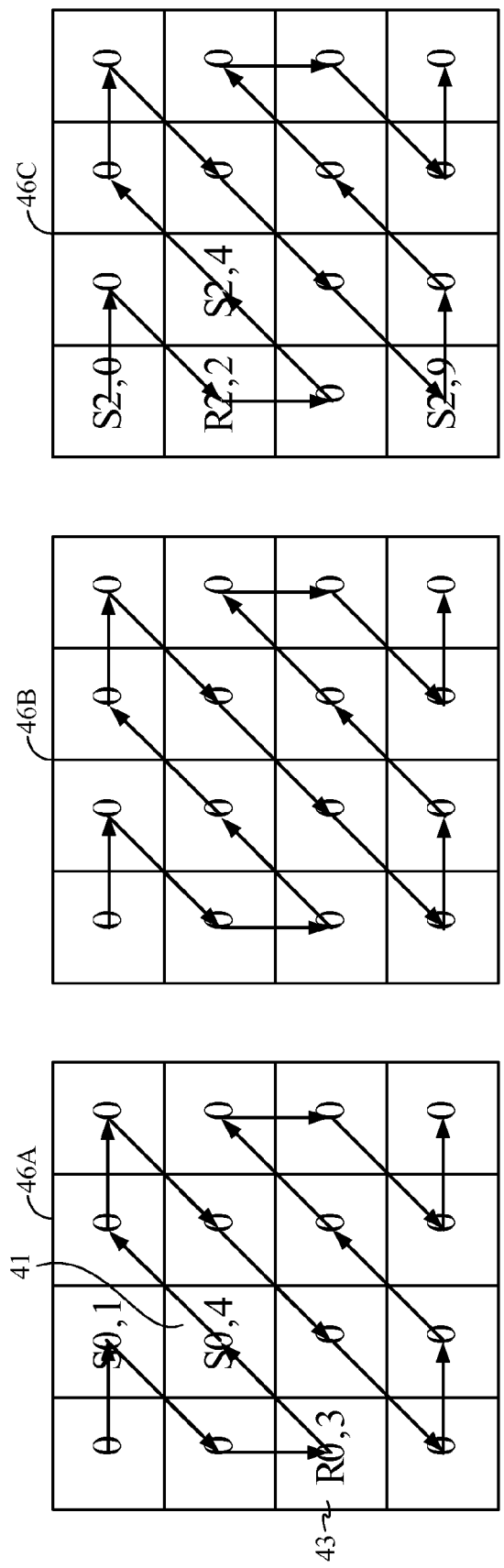
FIG. 4 is a diagram illustrating zigzag scanned blocks used in FGS coding of a video frame.

FIG. 4 is a diagram illustrating zigzag scanned blocks used in FGS coding of a video frame. In the example of FIG. 4, it is assumed that blocks 46A, 46B, and 46C are the first three blocks in an enhancement layer of a video frame. In this example, each block 46A, 46B, 46C is a 4-by-4 block of coefficients. Blocks 46A, 46B and 46C are depicted in the transform domain. Consequently, each number or variable in a block 46A, 46B, 46C is a quantized coefficient to be coded by a lossless entropy coding process. A coefficient with a label starting with letter "S," e.g., as indicated by reference numeral 41 in block 46A, is a nonzero significant coefficient. Because this block 46A is in an FGS SNR scalability enhancement layer, for each coefficient in a block, there is a corresponding coefficient in the base layer.

For a nonzero significant coefficient, its value is nonzero and its corresponding base layer coefficient is zero. For example, a coefficient "S0, 1" corresponds to a nonzero significant coefficient in block "0" at zigzag scan index "1." A coefficient labeled as "0" is a zero coefficient and its corresponding base layer coefficient is also zero. A coefficient with a label starting with letter "R," e.g., as indicated by reference numeral 43 in block 46A, is a refinement coefficient with a corresponding base layer coefficient that is nonzero, i.e., significant. The value of the refinement coefficient can be either zero or nonzero. For example, a coefficient "R2, 2" is a refinement coefficient in block "2" at zigzag scan index "2." In classifying the enhancement layer coefficients, a significance map is often used. This map indicates the locations of the coefficients that have become significant in the base layer already. The coefficients at these locations in the enhancement layer are refinement coefficients.

An enhancement layer encoder 40, as described herein, can be seen as an extension to an entropy coder used in coding the base layer, e.g., such as the entropy coder contemplated by the ITU-T H.264 standard. In particular, the block partition, transform and quantization used in the enhancement layer is similar to those used in the base layer. In order to code the zeros more efficiently, syntax elements such as coded block flag (CBF) and end of block (EOB) can be used. Similar syntax elements are also used in the base layer coding. A CBF is sent once for each block and indicates the presence of a nonzero significant coefficient in the block. If the CBF is 0, there is no nonzero significant coefficient; otherwise, there is at least one nonzero significant coefficient. The EOB flag is used to indicate whether the nonzero significant coefficient just coded is the last nonzero significant coefficient in the scanning order.

One difference between base layer encoder 38 and enhancement layer encoder 40 is in the separation of refinement coefficients from other coefficients in the FGS layer and the coding order. In the base layer, a block is completely coded before the next block is coded. In accordance with an embodiment of this disclosure, however, one feature of enhancement layer encoder 40 is that the coefficients from different blocks are interleaved with one another. Coefficients of the blocks are coded in cycles. In each cycle, only some coefficients from a given block are coded. In this manner, enhancement layer encoder 40 ensures that improvement to video quality is more uniform once the bitstream is truncated.

Figure 5:
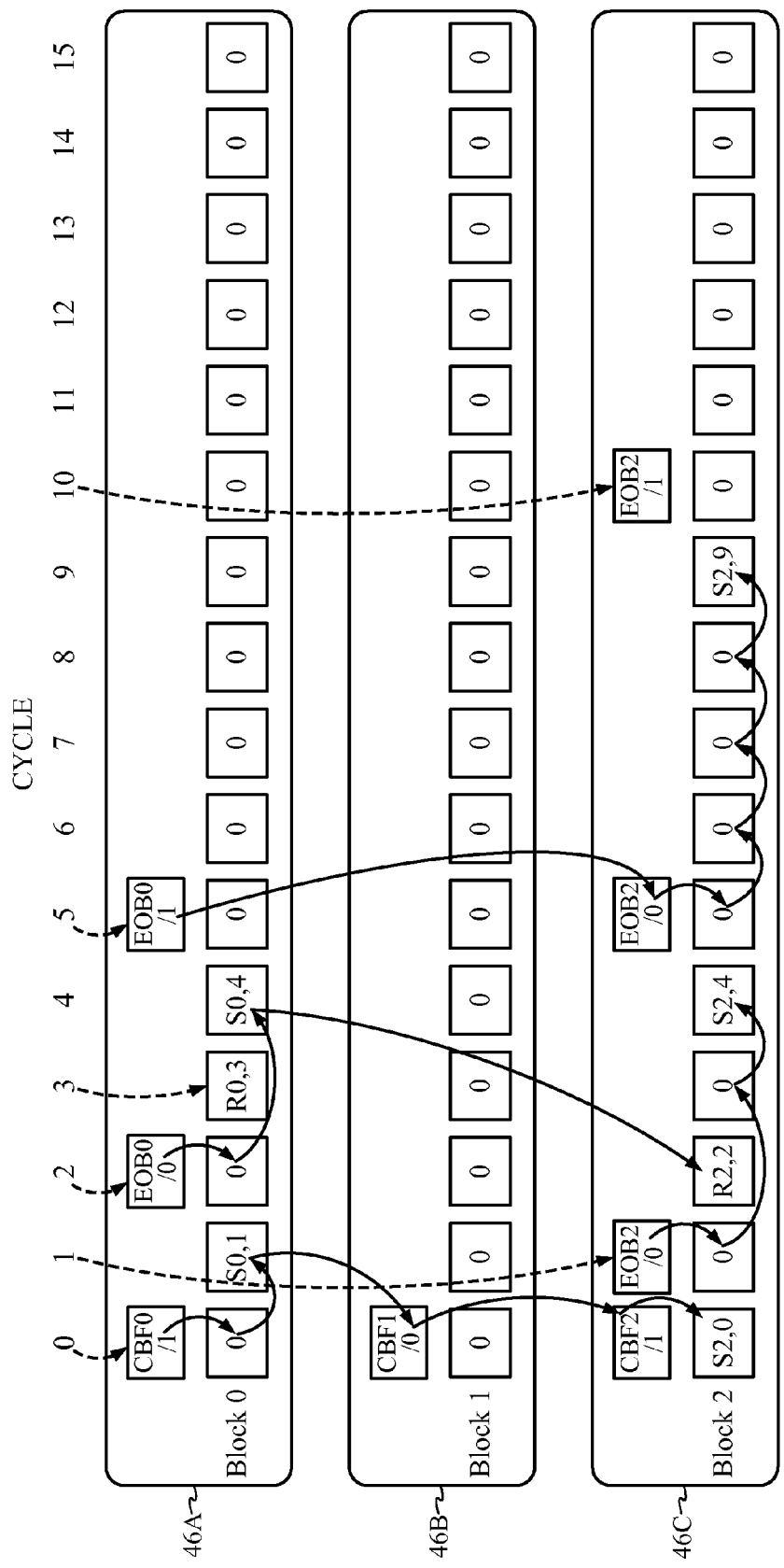
FIG. 5 is a diagram illustrating an exemplary coding order of syntax elements and coefficients in an FGS layer for different video blocks arranged in zigzag order.
Figure 6:
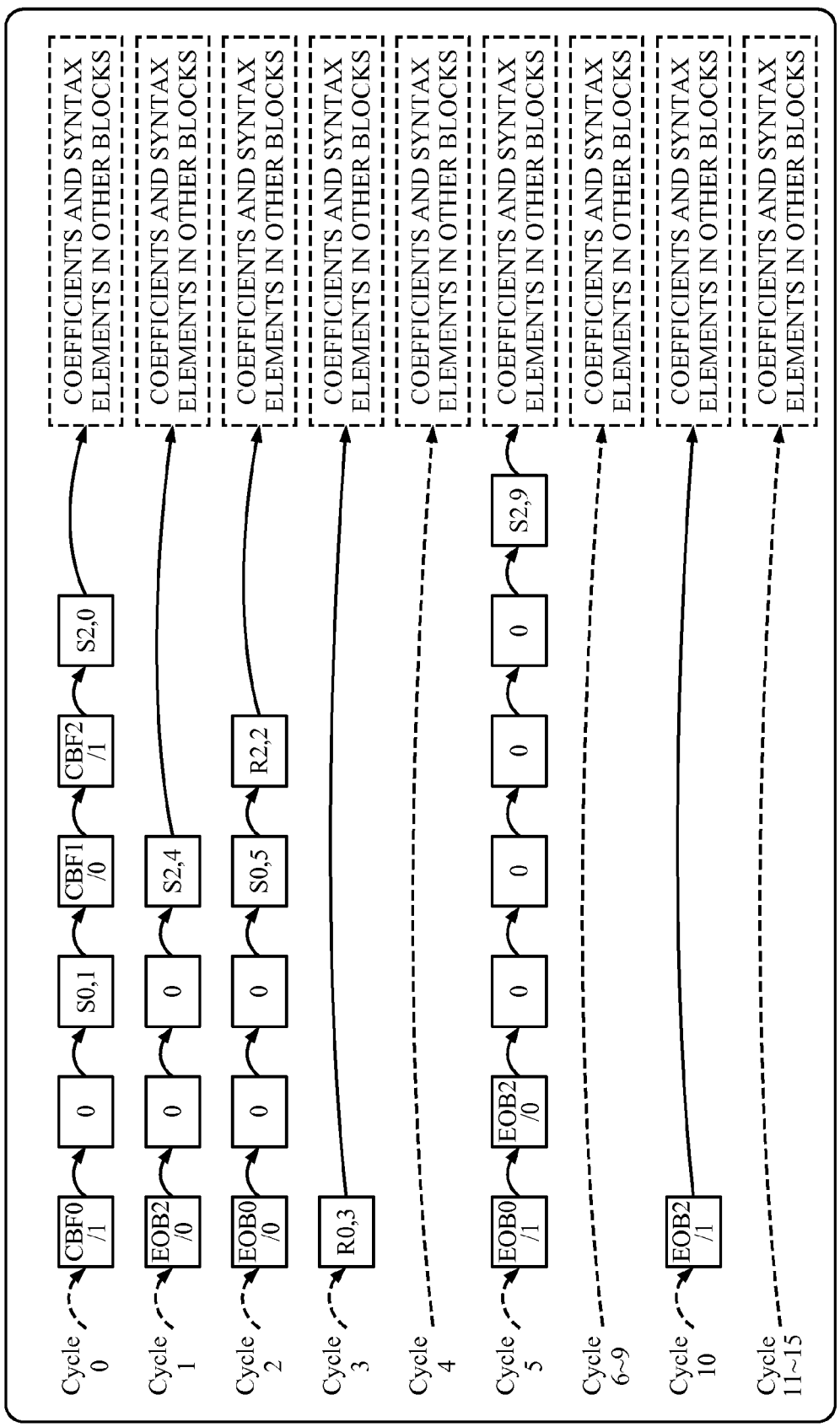
FIG. 6 is a diagram illustrating an exemplary coding order of syntax elements and coefficients in an FGS layer arranged for different video blocks in order of transmission.

FIG. 5 is a diagram illustrating an exemplary coding order of syntax elements and coefficients for different video blocks 46A, 46B, 46C arranged in zigzag order. FIG. 6 illustrates an exemplary coding order for transmission of syntax elements, in which the coefficients from each block are arranged horizontally in zigzag order. Each coefficient is represented in FIGS. 5 and 6 by a block. In the example of FIGS. 5 and 6, at most one nonzero coefficient is coded for a given block in a single cycle, and the cycle index happens to be the same as the zigzag scan index. However, the cycle index can also be defined differently and more than one nonzero coefficient can be coded, depending on design considerations. Each cycle in FIG. 5 corresponds to a given arrow that transitions from one coefficient to another coefficient in the zigzag order of FIG. 4.

As shown in FIG. 5, for cycle 0, a CBF is sent once for each block 46A, 46B, 46B, and indicates that there is a nonzero significant coefficient in the block. For example, CBF0/1 corresponds to the first block 0, and indicates that there is a nonzero significant coefficient in the block. In addition, a zero coefficient "0" and a nonzero coefficient "S0, 1" from block 0, which corresponds to a nonzero significant coefficient in block "0" at zigzag scan index "1," are sent in cycle 0. CBF1/0, however, corresponds to the second block 1 and indicates that there are no nonzero significant coefficients in the block. Hence, there are no coefficients sent for block 1 in subsequent cycles. Cycle 0 further includes CBF2/1, indicating that block 2 includes a nonzero significant coefficient, S2,0, and the coefficient S2,0 itself.

Cycle 1 includes an EOB flag (EOB2/0) for block 2, indicating that the nonzero significant coefficient just coded in cycle 0, which is S2,0, is not the last nonzero significant coefficient in the scanning order. Over the remaining cycles, the coding of blocks continues to follow the scan zigzag order, and includes syntax elements such as CBF and EOB, as appropriate. The example of FIGS. 4, 5 and 6 pertain to the first three 4×4 blocks in an enhancement layer of a video frame. However, the general scheme illustrated in FIGS. 4-6 may be applicable to blocks with larger sizes as well as larger numbers of blocks.

FIG. 6 is a diagram illustrating coding order of syntax elements and coefficients arranged for different video blocks in order of transmission. The coding order in FIG. 6 is equivalent to that in FIG. 5, except that syntax elements and coefficients are re-arranged so that the syntax elements and coefficients sent in a given cycle are listed horizontally. In the diagram of FIG. 6, the syntax elements and coefficients are sent from top to bottom in increasing cycle index order, and with each cycle, they are sent from left to right.

For example, cycle 0 shows CBF0/1 for the first block, followed by a zero coefficient, followed by S0,1, which corresponds to a nonzero significant coefficient in block "0" at zigzag scan index "1." Cycle 0 further includes CBF1/0, indicating no nonzero significant coefficients in block 1, and CBF2/1 and S2,0, which indicate and provide a nonzero significant coefficient for block 2. The process continues for cycles 1-15 in the zigzag scan order, where each cycle corresponds to one arrow transition in FIG. 4.

Spatial scalability allows video decoder 26 to reconstruct and display a video signal of higher spatial resolution, e.g., CIF instead of quarter common intermediate format (QCIF), by decoding the enhancement layer bitstream from a scalable video bitstream. The exemplary ordering of the syntax elements and coefficients in the FIGS. 4-6 supports the use of a generalized FGS format for both spatial scalability and FGS SNR scalability. Decoding the base layer bitstream allows the decoder 26 to obtain lower spatial resolution video, while decoding of one or more enhancement layers allows the decoder to improve SNR for the base layer spatial resolution and/or increase spatial resolution to a larger format.

Figure 7B:
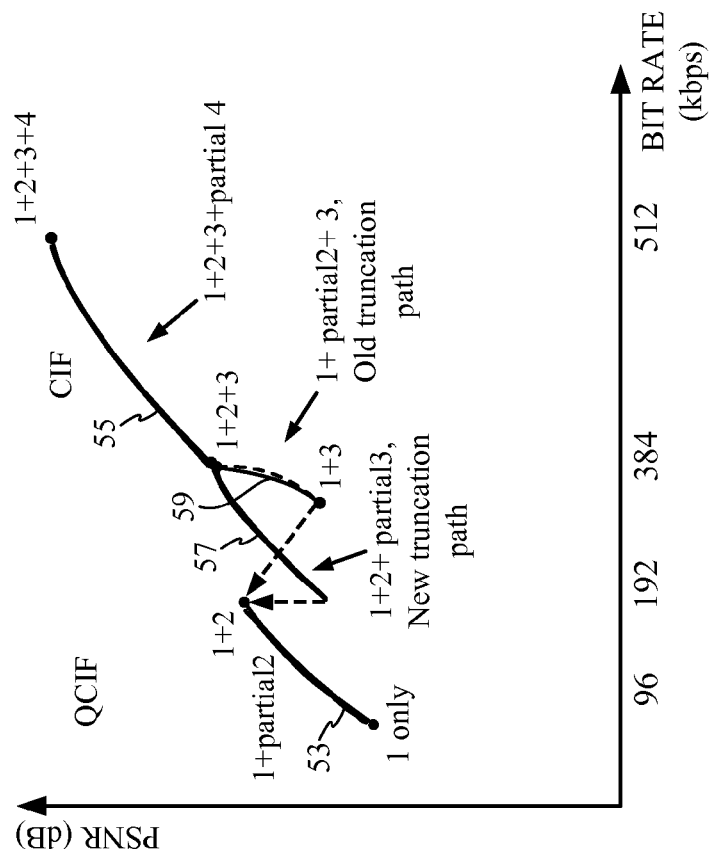
FIG. 7B is a diagram illustrating rate-distortion performance for the spatial scalability bitstreams of FIG. 7A.
Figure 7A:
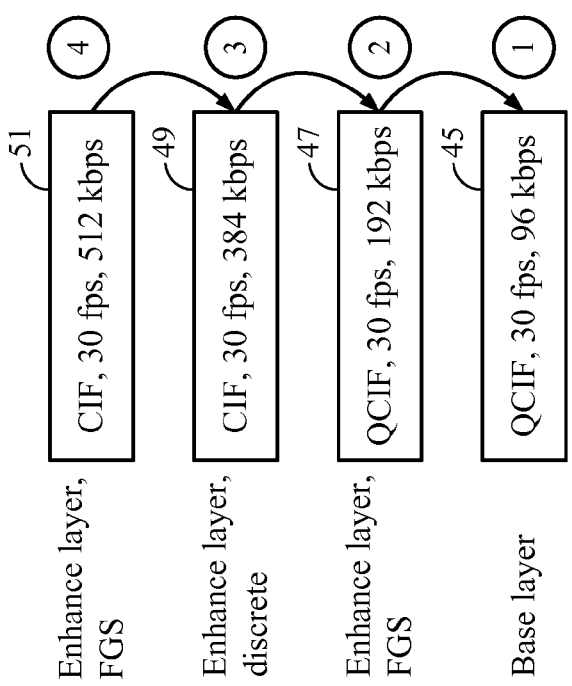
FIG. 7A is a diagram illustrating exemplary multi-layer spatial scalability bitstreams.

FIG. 7A is a diagram illustrating multi-layer bitstreams including a spatial scalability enhancement layer bitstream. FIG. 7B is a diagram illustrating rate-distortion (R-D) performance for the spatial scalability bitstreams of FIG. 7A. FIGS. 7A and 7B provide an example of both spatial scalability and FGS SNR scalability. Decoding base layer 45 generates a bitstream 1 of FIG. 7A, which allows decoder 26 to obtain relatively low spatial resolution video, e.g., QCIF spatial resolution at 30 frames per second (fps), at a minimum quality (SNR) level. Bitstream 2 in FIG. 7A is provided in a first FGS enhancement layer bitstream 47 that improves the QCIF video quality (SNR) by some amount, e.g., 3 dB.

Decoding of enhancement layer 49 provides an additional bitstream 3 that supports spatial scalability. Decoding bitstream 3 in enhancement layer 49 of FIG. 7A allows decoder 26 to obtain higher spatial resolution video, e.g., CIF spatial resolution at 30 fps. Enhancement layer 51 provides an additional bitstream 4 that also has FGS SNR scalability. Decoding of enhancement layer 51 further improves the CIF video quality but does not affect the spatial resolution of the resulting video. As shown in FIG. 7A, base layer 45, enhancement layer 47, enhancement layer 49 and enhancement layer 51 require 96 kilobits per second (kbps), 192 kbps, 384 kbps, and 512 kbps, respectively, of channel bandwidth for full transmission. In the example, the bit rate of an enhancement layer includes the bit rate of all the lower layers. For example, a bit rate of 192 kbps of layer 47 includes the 96 kbps of layer 45. Similarly, the 384 kbps bit rate of layer 49 includes the 192 kbps bit rate of layer 47 and the 96 kbps bit rate of layer 45.

System 10 is configured to support generalized Fine Granularity Scalability (FGS), in accordance with this disclosure. In this sense, system 10 offers an improvement over other systems in which spatial scalability is realized only by sending discrete enhancement layers. With FGS, instead of processing a discrete enhancement layer in its entirety, it is possible to truncate a spatial scalable enhancement layer or layers at virtually any point. Consequently, with FGS, decoder 26 can increase the spatial resolution of video frames without parsing and decoding an entire enhancement layer bitstream. However, system 10 further implements one or more schemes to reduce error propagation due to partial decoding.

FIG. 7B shows peak signal-to-noise ratio (PSNR) in decibels (dB) for different bit rates and spatial resolutions. In particular, FIG. 7B shows CIF and QCIF rate-distortion (RD) curves. In the example of FIG. 7B, the CIF and QCIF rate-distortion curves are disjointed in terms of bit rate transition. Reference numeral 53 in FIG. 7B identifies the QCIF SNR scalability path, whereas reference numeral 55 identifies the CIF SNR scalability path. Reference numeral 57 shows the gradual and substantially continuous FGS spatial scalability path between QCIF and CIF, whereas reference numeral 59 shows the abrupt discrete enhancement layer SPATIAL scalability path.

The notations in FIG. 7B indicate the combinations of base layer and enhancement layers used to increase SNR and/or spatial scalability from one point to another, with reference to the layers shown in FIG. 7A. For example, "1 only" indicates that only the base layer bitstream of FIG. 7A is decoded to produce a QCIF video frame of minimum SNR quality. The notation "1+partial 2" indicates that both the base layer bitstream and a portion of the first enhancement layer bitstream are decoded to produce a QCIF video frame with enhanced SNR quality, whereas "1+2" indicates full decoding of both the base layer bitstream and the first enhancement layer bitstream to achieve enhanced SNR quality. The notation "1+2+ partial 3" identifies the spatial scalability path from QCIF to CIF permitted by partial decoding of enhancement layer 3 using a generalized FGS approach, in accordance with this disclosure.

System 10, as described in this disclosure, provides generalized FGS for spatial resolution enhancement by sending spatial scalable enhancement layers in FGS format. This approach permits spatial scalable enhancement bitstreams to be truncated at any point to fit into certain network/channel conditions and/or decoder capabilities. In this manner, better network/channel conditions and/or decoders with higher capabilities will be able to reconstruct video with higher spatial resolution and continuously improved video quality while more bits are received and decoded. The use of a generalized FGS approach for spatial scalability provides a significant improvement over the full decoding of discrete enhancement layers.

With generalized FGS for spatial resolution enhancement, the R-D curves for video having different spatial resolution will be joined together in terms of bit rate transition. In this manner, generalized FGS for spatial resolution enhancement provides continuously improved video quality with a substantially continuous R-D curve 57 between different spatial resolution video, e.g., QCIF 53 and CIF 55, rather than disjointed R-D curves, like curve 59. In particular, note the gap between the point 1+2 on QCIF SNR curve 53, which indicates full decoding of the base layer and first enhancement layer of FIG. 7A, and the point 1+3 on discrete spatial enhancement layer curve 59, which indicates the full decoding of the base layer and second enhancement layer of FIG. 7A.

As an example, with reference to the diagram of FIG. 7A and the associated graph of FIG. 7B, it is assumed that it is desirable to produce CIF video, rather than the QCIF video provided by base layer 1. It is further assumed, however, that channel conditions will not support the 384 kilobits per second (kbps) rate required for full transmission and decoding of discrete enhancement layer 49. In this case, the FGS enhancement layer 47 may be truncated to an acceptable level to obtain CIF video with a bit rate of less than 384 kbps. While this allows continuous quality improvement between 288 kbps (when 0% of bitstream 2 is sent) and 384 kbps (when 100% of bitstream 2 is sent), the R-D performance of such bitstream truncation may be sub-optimal as indicated by curve 59 (1+partial 2+3, "Old truncation path") in FIG. 7B. In this case, 1+partial 2+3 represents full decoding of base layer 1, partial decoding of FGS enhancement layer 2 and full decoding of discrete enhancement layer 3. Such R-D performance is not desirable. Allowing generalized FGS, instead of fully decoding a discrete enhancement layer 3, the R-D performance curve connecting two spatial resolutions will be improved from curve 59 (1+partial 2+3) to the curve 57 (1+2+partial 3 "New truncation path"), which spans substantially the entire spatial scale between the QCIF curve 53 and the CIF curve 55.

Hence, to avoid disjointed R-D curves between different spatial resolution video and/or avoid less desirable coding performance, system 10 is configured to provide generalized FGS for spatial resolution enhancement. To accomplish spatial scalability using generalized FGS with good coding performance, one or more unique coding schemes are applied, either alone or in combination, to suppress error propagation. Partial decoding of enhancement layers to support FGS spatial scalability can produce significant error propagation. The additional schemes described in this disclosure may be effective in curbing error propagation that otherwise could result from the use of generalized FGS to achieve spatial scalability with continuously improved video quality.

For example, in one embodiment, system 10 applies a leaky prediction scheme in intra-frame prediction to reduce drifting, a special DC mode for intra blocks to reduce spatial error propagation, and/or a constraint of using only the pixels in the base layer for intra prediction. In addition, system 10 may send syntax elements describing how an enhancement layer should be predicted, e.g., whether it is inter- or intra-predicted and how the block was partitioned. In some embodiments, system 10 also may support either FGS spatial scalability or discrete spatial scalability on a selective basis. Each of these additional error abatement schemes will be described below in further detail.

FGS layer bitstreams may contain only quantized residual transform coefficients but no mode and motion information. In order to achieve spatial scalability using FGS, mode and motion information also should be sent. This can be achieved using syntaxes similar to those defined for discrete enhancement layers. For macroblock mode, intra (I) modes (I_N×N, I_16×16), intra (I)_BL (base layer) mode, and inter (P or B) modes can be supported. The I_BL mode is an inter-layer texture prediction mode. In this mode, a block of pixels in the enhancement layer is predicted from the reconstructed pixels in the base layer. If the resolution of the enhancement layer is different from that of the base layer, the base layer reconstructed pixels should be properly upsampled to the enhancement layer resolution. If the resolution of the enhancement layer is the same as the base layer, upsampling of the base layer reconstructed pixels to effect the leaky prediction technique is not necessary. Instead, leaky prediction can be accomplished without upsampling. In the event upsampling is necessary, any of a variety of interpolation techniques may be used for upsampling. For motion vectors and a reference picture index, they can either be derived or refined from the base layer bitstream or sent directly in the enhancement layer bitstream.

Figure 8A:
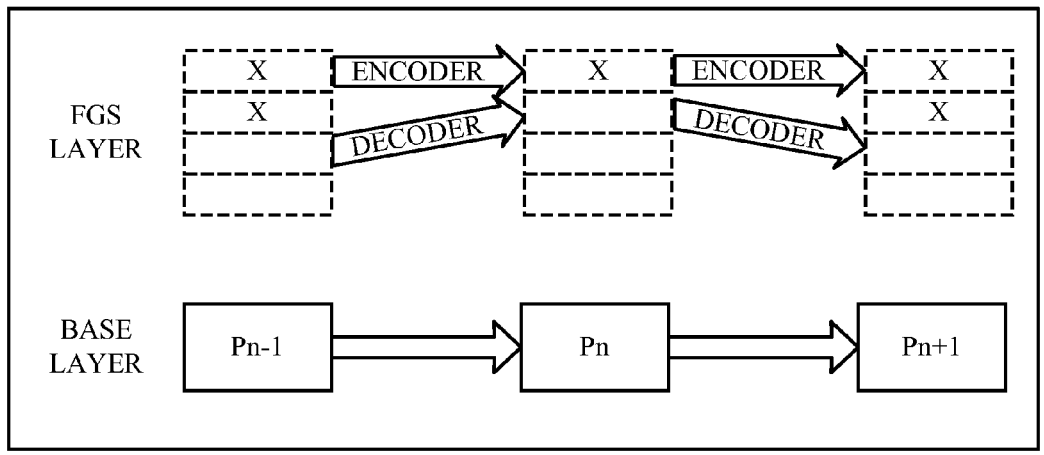
FIG. 8A is a diagram illustrating the drifting error problems caused by the use of different reference signals in an encoder and decoder.
Figure 8B:
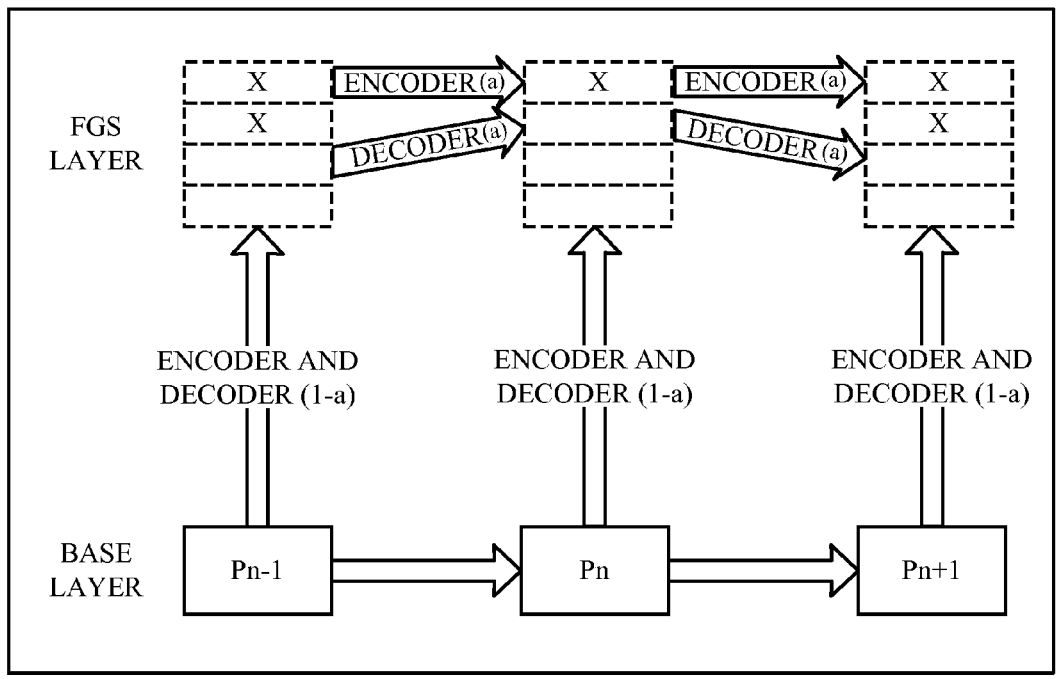
FIG. 8B is a diagram illustrating partial prediction from a base layer to attenuate the drifting error problem shown in FIG. 8A.

FIG. 8A is a diagram illustrating the drift problems caused by the use of different reference frames in an encoder and decoder due to partial decoding of an FGS enhancement layer. FIG. 8B is a diagram illustrating partial prediction from a base layer, i.e., leaky prediction, to attenuate the drift problem shown in FIG. 8A. Partial decoding of the FGS bitstream, i.e., bitstream truncation, can cause a drifting problem. In particular, when decoder 26 uses the partially received enhancement layer bitstream to reconstruct macroblocks and later uses the same macroblocks in inter-prediction, there is a mismatch between the encoder and the decoder, as shown in FIG. 8A. A leaky prediction scheme, in accordance with this disclosure, can at least partially reduce the drifting problem. In leaky prediction, as shown in FIG. 8B, a prediction signal is formed partially from the FGS enhancement layer (e.g., by a factor of a, $0<=a<1$) and partially from the base layer (e.g., by a factor of 1-a). Because the base layer signal is always fully received, any errors E due to partial decoding of the enhancement layer will be attenuated by the factor "a" and become $a*E$, $a^2*E$, $a^3*E$, and so forth in the subsequent frames.

Figure 9:
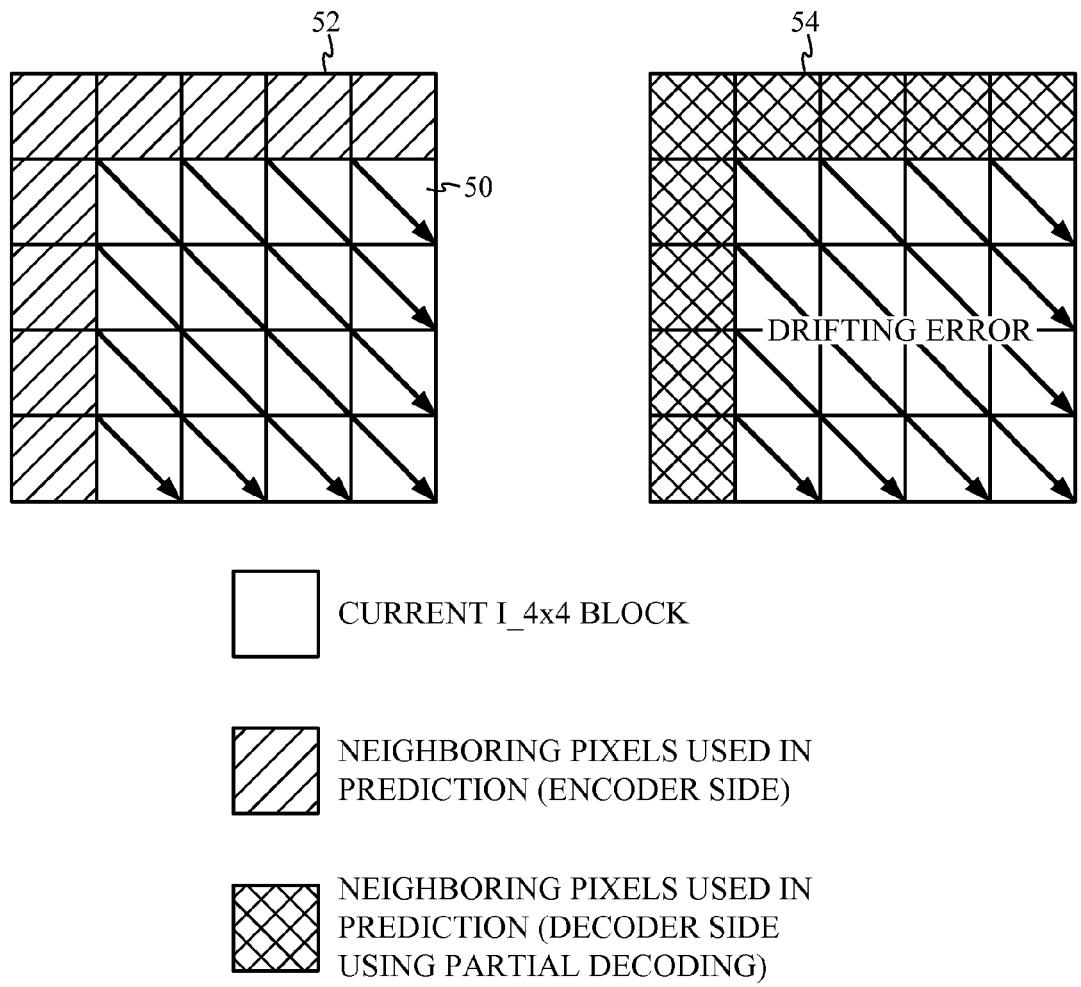
FIG. 9 is a diagram illustrating drifting error caused by partial decoding of neighboring blocks.
Figure 10:
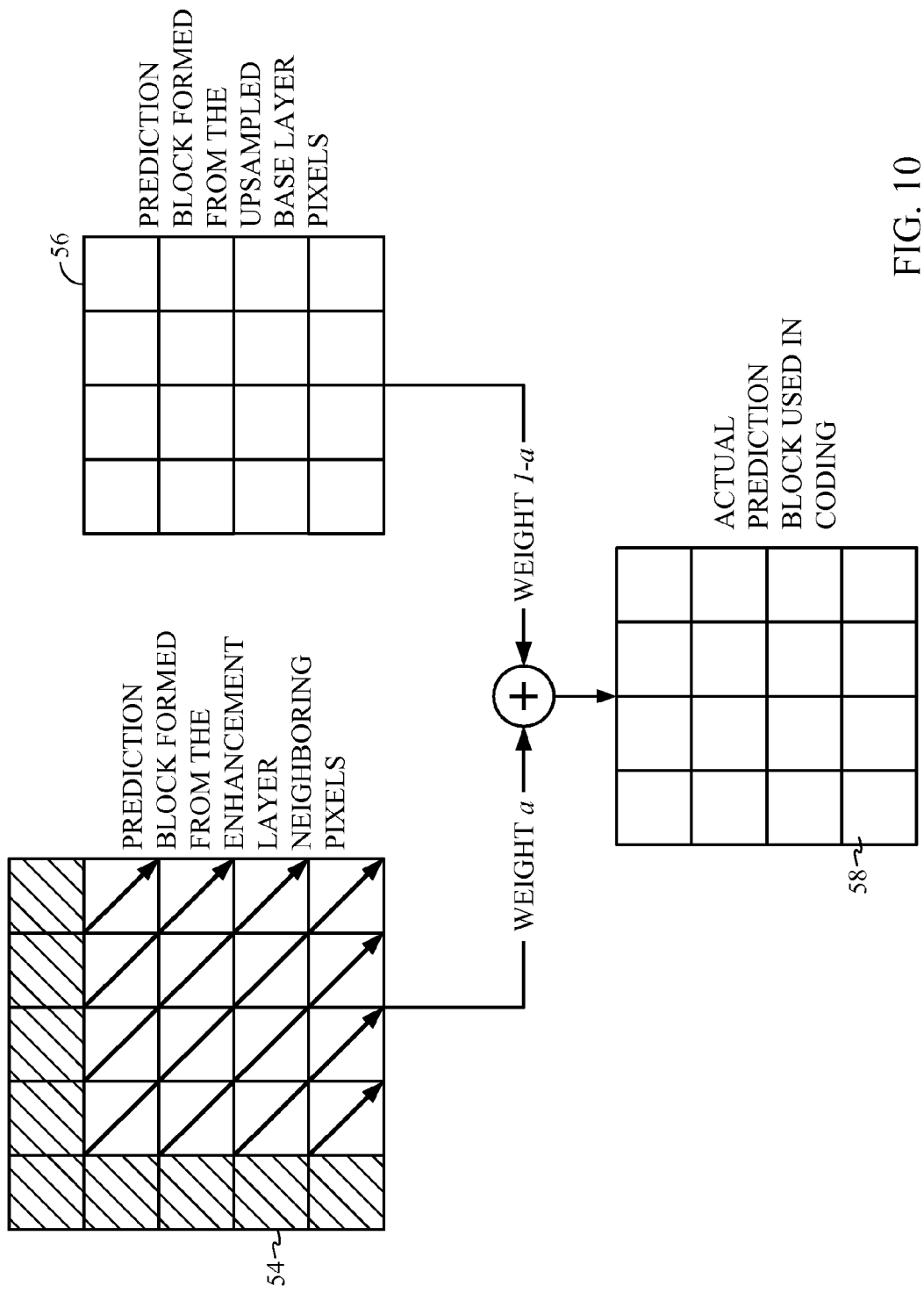
FIG. 10 is a diagram illustrating a leaky prediction technique to attenuate drifting error in intra-coded blocks.

FIG. 9 is a diagram illustrating drifting error caused by partial decoding of neighboring pixels. FIG. 10 is a diagram illustrating formation of neighboring pixels using the leaky prediction scheme to attenuate drifting error. System 10 may be configured to extend leaky prediction to intra-macroblocks, as well as inter-macroblocks. In the example of FIG. 9, reference numeral 50 indicates a current I_4×4 block, reference numeral 52 indicates neighboring pixels used in prediction at the encoder side, and reference numeral 54 indicates neighboring pixels used in prediction at the decoder side using partial decoding. For intra prediction, the pixels of a block are predicted from the edge pixels of neighboring, previously decoded blocks. Partial decoding of an enhancement layer blocks causes the neighboring pixels used by the decoder for intra prediction of a video block to be different than those used by the encoder, resulting in drifting error.

FIG. 9 shows an example of an intra (I)_4×4 diagonal mode for the leaky prediction scheme. In the example of FIG. 9, for current block 50, partial decoding of enhancement layer bits representing neighbor blocks cause the neighbor pixels 54 used in the I_4×4 diagonal mode at the decoder side to be different from the neighbor pixels 52 used at the encoder side. In other words, the neighboring pixels used to predict a given block 50 can be different at the decoder and encoder when the decoder only partially decodes the enhancement layer bits. Therefore, the predicted 4×4 block is altered, causing drifting errors in the reconstructed block. Such drifting errors will be propagated to neighboring 4×4 blocks again when the pixels in the current block 50 are used in the prediction of the next blocks at the decoder side, resulting in potentially severe error propagation.

To attenuate the leakage problem, FIG. 10 illustrates application of a leaky prediction technique in which a 4×4 prediction block 58 is formed by the weighted average (with a weighting factor of a) of a prediction block constructed from the enhancement layer neighbor pixels 54 and an upsampled base layer prediction block 56. The upsampled base layer pixels used to form the prediction block are pixels corresponding to the actual block to be predicted. The pixels used to form the prediction block constructed from the enhancement layer are neighbor pixels from previously decoded blocks along the edge of the actual block to be predicted. At the decoder side, the pixel values in the resulting prediction block 58 are the sum of a prediction block reconstructed from the neighbor pixels of the enhancement layer video block multiplied by factor a and a prediction block reconstructed from the upsampled base layer prediction block 56 multiplied by a factor of 1-a.

In each case, the neighbor pixels from the enhancement layer prediction block are used in combination with the upsampled base layer prediction block to predict an intra block. For the enhancement layer, not all blocks may be received, resulting in only partial decoding. For the base layer, all blocks are received, but at a lower resolution than the enhancement layer. The weighted average of the neighbor pixels of the enhancement layer prediction block and the upsampled base layer prediction block serves to reduce drifting errors in the reconstructed block 58, and alleviates the potential problems presented by partial decoding of an enhancement layer in spatial FGS coding.

Hence, in the leaky prediction scheme, a prediction block formed from enhancement layer neighboring pixels and a prediction block formed from upsampled base layer pixels are weighted to produce an actual prediction block for use in coding. Upsampling of the base layer pixels provides a base layer prediction block in the same resolution as the enhancement layer prediction block. In some embodiments, however, if the base layer and enhancement layer have the same spatial resolution, the base layer pixels need not be upsampled. Instead, leaky prediction can be performed without upsampling. Upsampling of the base layer pixels is performed if the video defined by the enhancement layer is at a resolution greater than the resolution of the video defined by the base layer. Although intra_4×4 prediction is used as an example in FIGS. 9 and 10, the leaky prediction scheme can be applied to other intra prediction types, such as intra_8×8 or intra_16×16 prediction of luma samples, or chroma intra prediction. In the example of FIG. 10, decoder 26 applies leaky prediction to weight the prediction block constructed from the enhancement layer neighboring pixels with a weight a and weight the upsampled base layer prediction block with a weight 1-a to produce the prediction block that attenuates drifting error. However, other factors or weightings, including more complex weighting functions, may be used to reduce drifting error, e.g., as described below.

Leaky prediction for intra-coded blocks, as shown in FIGS. 9 and 10, curbs error propagation and promotes improved quality in the generalized FGS technique. When the bitstream is partially decoded, other techniques could be used. If a significant amount of the enhancement layer bitstream is not received, at some point, for some blocks, the neighboring prediction will be worse than the base layer prediction. The weighting factor used in calculating the predictors, which are the weighted average between the predictors constructed from the neighboring pixels and the base layer predictors, can be made dynamically adjustable. The value of the weighting factor may depend on the amount of the bitstream decoded. If more bitstream is decoded, the weighting factor for the predictors constructed from the neighboring pixels may be higher. The weighting factor used when the entire enhancement layer bitstream is decoded may also be content dependent. For example, the weighting factor value applied to intra-prediction may depend on how the base layer was predicted.

Figure 11:
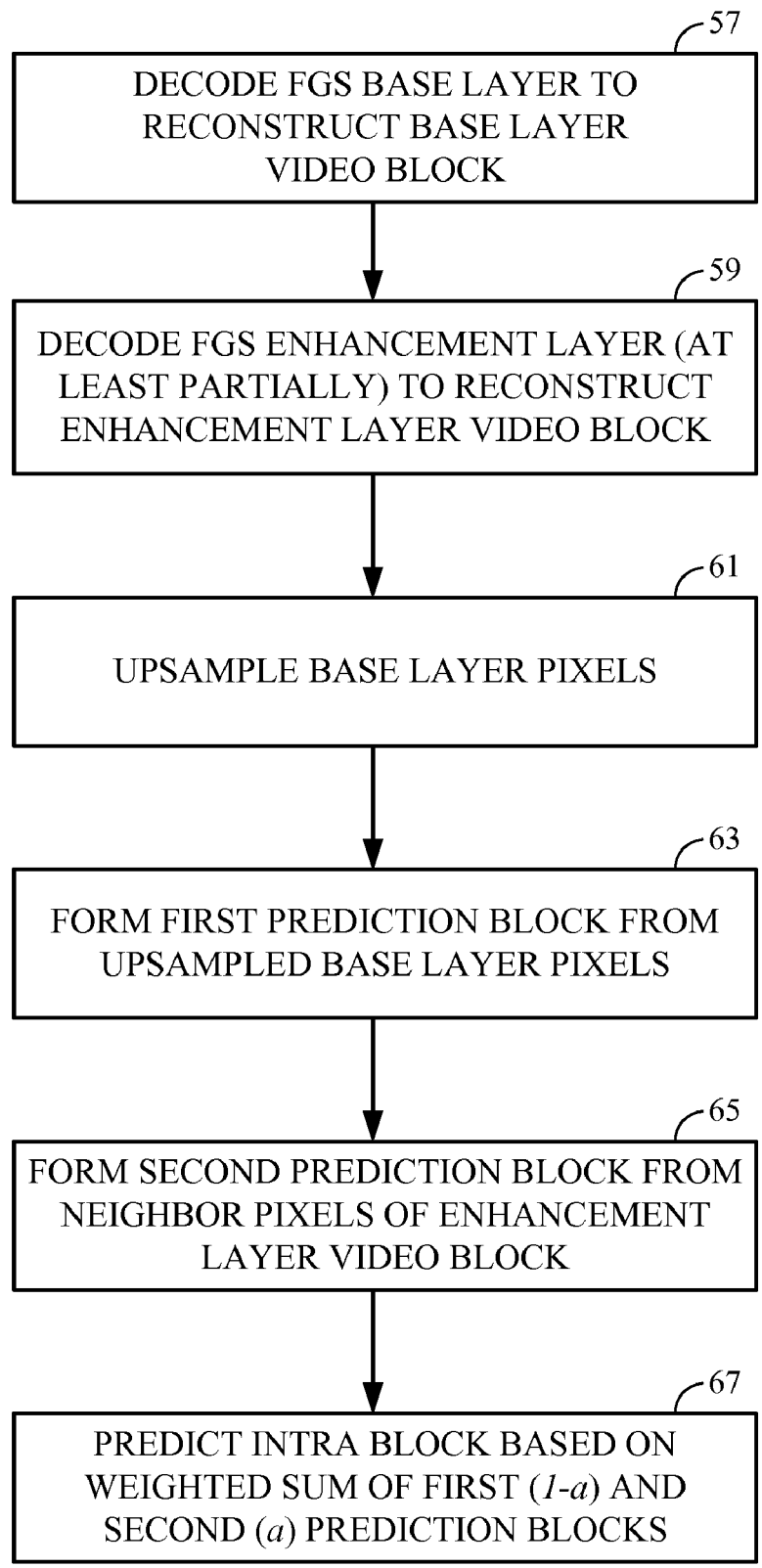
FIG. 11 is a flow diagram illustrating operation of a leaky prediction technique as shown in FIG. 10.

FIG. 11 is a flow diagram illustrating operation of a leaky prediction technique as shown in FIG. 10. As shown in FIG. 11, decoder 26 decodes the FGS base layer to reconstruct base layer video blocks (57), and at least partially decodes one or more FGS enhancement layers to reconstruct enhancement layer video blocks (59). Because the FGS enhancement layers may only be partially decoded, decoder 26 applies a leaky prediction technique for decoding of intra-coded blocks. For this reason, reliance on neighboring pixels from the partially decoded enhancement layer to reconstruct an intra-coded prediction block would result in significant drifting error due to the possibility of use of different pixels on the encoder and decoder sides.

To implement the leaky prediction technique, in an exemplary embodiment, decoder 26 upsamples the base layer pixels (61) and forms a first prediction block from the upsampled base layer pixels (63). The base layer pixels may be upsampled to the resolution of the enhancement layer, if the enhancement layer resolution is greater than the base layer resolution, producing a prediction block that corresponds to the resolution of the intra-coded block to be predicted. If the resolutions of the enhancement layer and the base layer are equal, it is not necessary to upsample the base layer pixels. Instead, the leaky prediction technique may proceed on the basis of a prediction block formed from base layer pixels that are not upsampled. Accordingly, upsampling of the base layer pixels is optional and is applied when the enhancement layer resolution is greater than the base layer resolution. With further reference to FIG. 1, decoder 26 also forms a second prediction block from the neighboring pixels of a corresponding enhancement layer video block (65). In particular, decoder 26 selects pixels in the decoded enhancement layer that neighbor the intra-coded block to be predicted. Using the first and second prediction blocks, decoder 26 predicts the intra-coded block (67).

Specifically, as shown in the example of FIG. 11, decoder 26 predicts the intra block based on a weighted sum of the first prediction block produced from the upsampled base layer pixels and the second prediction block produced from the neighbor pixels in the enhancement layer block (67). In this manner, by combining base layer and enhancement layer pixels, decoder 26 reduces the amount of drifting error that otherwise could result due to partial decoding of the enhancement layer. The leaky prediction technique may be applied to some or all intra-coded blocks in a video slice. In each case, a different combination of enhancement layer neighboring pixels and base layer pixels is selected to correspond to the intra-coded block to be predicted.

In addition to leaky prediction, a generalized FGS approach for spatial scalability may provide a special DC mode for intra macroblocks to prevent spatial error propagation. Even with leaky prediction using base layer information, the drifting error may still accumulate as distance from the error origin increases. A DC coefficient ordinarily refers to a coefficient in the upper left corner of a block, and is encoded with the prediction derived from the neighboring blocks.

To alleviate spatial error propagation, system 10 may be configured to provide a special DC mode for generalized FGS. All intra macroblock types (including I_4×4, I_8×8 and I_16×16) can use this special DC mode. When the special DC mode is used, the DC coefficient of the N×N block (N=4, 8, or 16) is predicted from a default value known by both the encoder and the decoder instead of any value derived from the information in the neighboring blocks, and the AC coefficients are coded without any prediction. Hence, the special DC mode avoids derivation of a value from the neighboring blocks, and instead relies on a predetermined default value. In this disclosure, the special DC mode is used for controlling the error propagation and may be used even if all necessary neighboring blocks are available for intra prediction. The number of bits needed to code the DC value depends on the quantization parameter. Once the number of bits is determined, the DC value may be coded using fixed-length coding. The DC value may also be coded using other Variable Length Codes.

Figure 15:
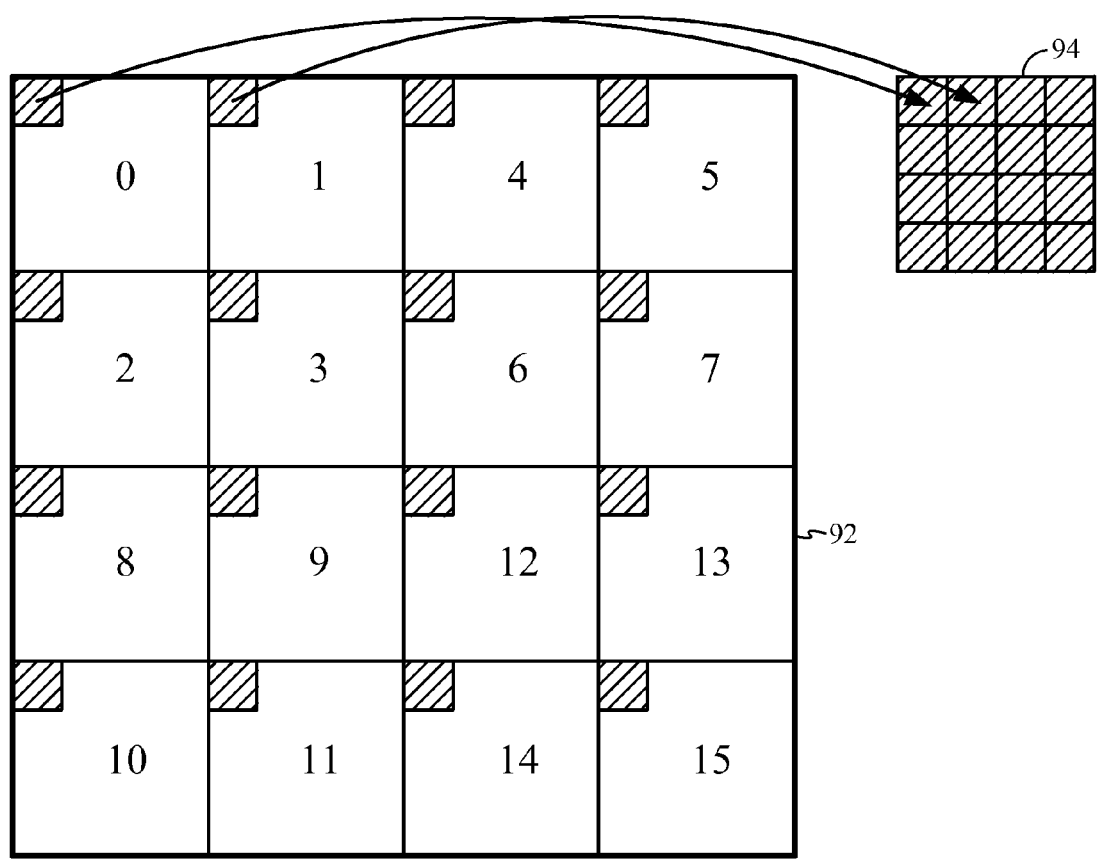
FIG. 15 is a diagram illustrating a luma DC block in a macroblock with an Intra 16 by 16 prediction mode.

FIG. 12 is a diagram illustrating application of a special DC mode of a video block. In particular, FIG. 12 shows the encoding of an I_4×4 special DC mode, using a 4×4 block as an example. For the example of FIG. 12, an I_8×8 special DC mode is similar to the I_4×4 special DC mode, except that 8×8 block transform is used and the DC coefficient is calculated from the 8×8 block. For an I_16×16 special DC mode, the transform strategy defined in ITU-T H.264 may be used and the DC coefficient is the DC coefficient in block 94 which is after application of the Hadamard transform, e.g., as shown in FIG. 15.

The special DC mode can be sent with the encoded bitstream as an extra mode, i.e., in addition to other established intra prediction modes. For example, in the ITU-T H.264 standard, there are already nine established I_4×4 prediction modes known to those skilled in the art. If the special DC mode is an extra mode, it may be the tenth mode. For an I_16×16 macroblock, the special DC mode may be the fifth mode. According to an alternative implementation, the special DC mode may replace a mode that is already established. As a further alternative, the special DC mode may replace the original DC mode under particular conditions that can be derived from the bitstream.

As shown in FIG. 12, encoder 20 applies the special DC mode to encode the I_4×4 block 60. Encoder 20 applies a 4×4 block transform 61 to block 60, and applies DC coefficient prediction 62 with a predictor 70, which produces a default DC coefficient value known to both the encoder and decoder. Encoder 20 applies quantization 63 to the transformed block after DC prediction, and then applies an entropy coder 64 to produce the encoded block that will be transmitted. An inverse process is used to reconstruct the block. For example, decoder 26 applies entropy decoding 65 and dequantization 66, followed by inverse DC coefficient value prediction 67 using a value produced by default DC coefficient predictor 70. Hence, encoder 20 and decoder 26 each may include a functional unit that functions as default DC coefficient predictor 70 to produce a default DC coefficient value that is known to both the encoder and decoder. Following inverse DC prediction 67, decoder 26 performs a 4×4 block inverse transform to produce the predicted block 69. DC coefficient prediction can also be performed equivalently in the pixel domain by subtracting a predictor from all of the pixels in the block.

FIG. 13 is a diagram illustrating use of the special DC mode for different intra prediction modes. Some systems have a single loop decoding option. For example, a bitstream may have two layers of different resolutions. If the user is only interested in the high resolution video, and the bitstream supports single loop decoding, it is necessary to perform motion compensation only at the high resolution layer. This is achieved by enforcing certain prediction constraints. For example, one constraint may require that the intra macroblock cannot be predicted from the neighbor inter macroblocks, and the intra_BL (base layer) mode is used in the enhancement layer only if the base layer macroblock is coded in a normal intra mode or intra_BL mode, so that this macroblock in the base layer can be reconstructed and used in prediction, without performing any motion compensation.

When single loop decoding is used, and the corresponding base layer macroblock is not intra-coded, leaky prediction cannot be used because there are no base layer pixels available. In this case, to limit error propagation from the spatial neighbors, when the enhancement layer macroblock is signaled to be I_4×4, in one embodiment, it is inferred that the seven border 4×4 blocks are in the special DC mode. In single-loop decoding, when an enhancement layer macroblock is intra, border blocks (dark blocks 72 in FIG. 13) are inferred to be in the special DC mode. Non-border blocks 74 can still use any intra prediction modes with proper error control schemes presented above.

Similarly, when the enhancement layer macroblock is signaled to be I_8×8, the three border 8×8 blocks 76 are inferred to be in the special DC mode, while block 78 can use any intra prediction mode with proper error control schemes presented above. When the enhancement layer macroblock is I_16×16, as indicated by reference numeral 80, it is inferred that the special DC mode is used. Note that, in FIG. 13, other non-border 4×4 or 8×8 blocks 74, 78 in the respective macroblock can still use other intra prediction modes. In another embodiment, the blocks at any location can be special DC mode and the mode can be explicitly signaled.

Figure 14:
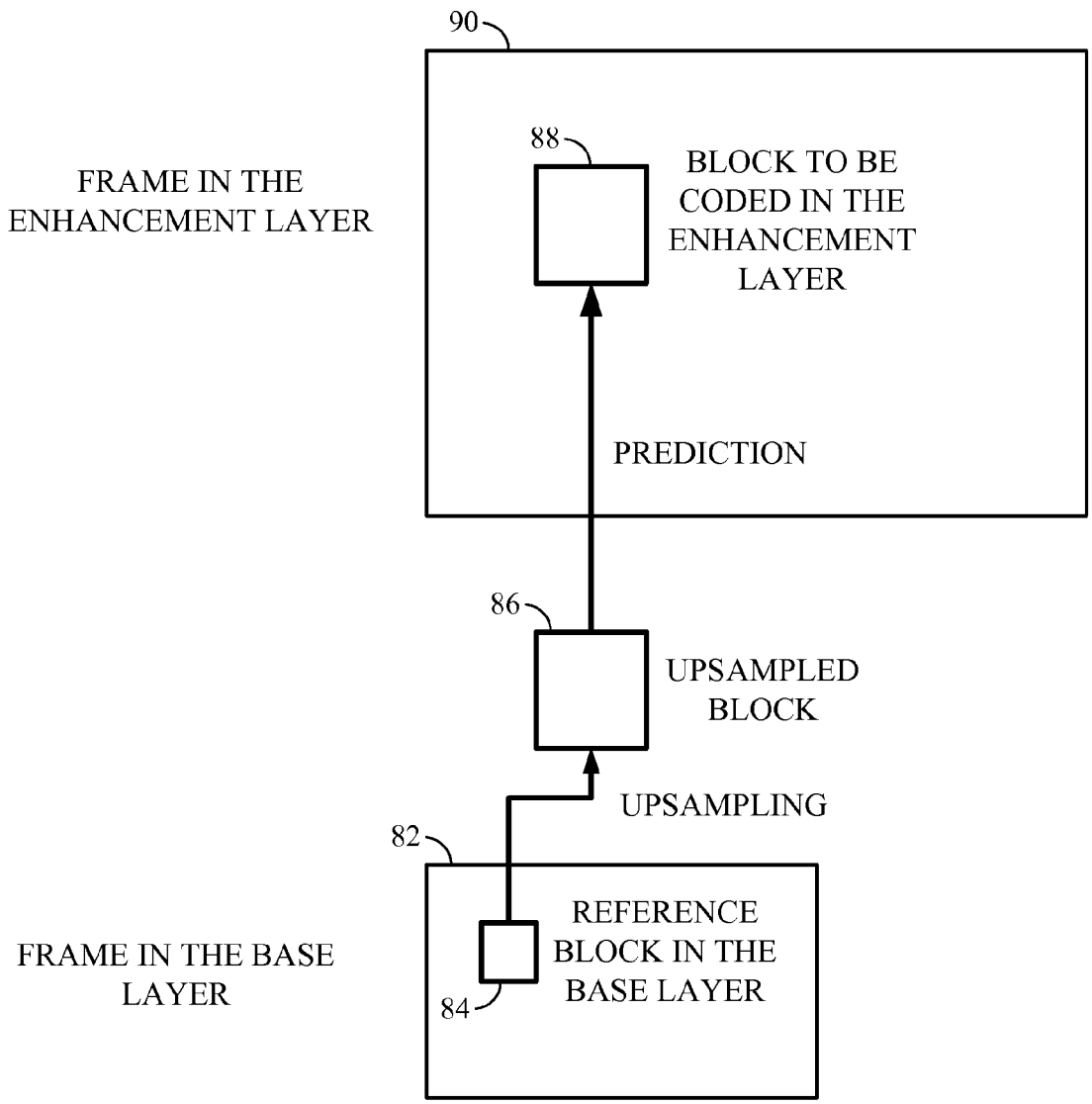
FIG. 14 is a diagram illustrating Intra-prediction from a frame in a base layer.

FIG. 14 is a diagram illustrating Intra-prediction from a frame 82 in a base layer. FIG. 14 shows upsampling of a block 84 in a frame 82 of the base layer to produce upsampled block 86. The upsampled block 86 is used for prediction of a block 88 to be coded in a frame 90 of the enhancement layer. As shown in FIG. 14, a constraint may also be applied in the enhancement layer to not use intra-layer intra prediction. In one embodiment, for example, one constraint can be enforced so that the prediction is not formed with the pixels, or other information derived from the pixels, from the same frame in the same layer as the block to be predicted to simplify the design. In other words, a block in an enhancement layer is not predicted using pixels or other information obtained from the same frame and same layer as the block to be predicted. In this case, the prediction is formed with the pixels, or other information derived from the pixels, from either a frame in the base layer or other frames already coded or a combination of both. In this manner, decoder 26 may apply the constraint of using only the pixels in the base layer for intra prediction. The frame 82 in the base layer can be of the same resolution or a different resolution.

To support spatial scalability using generalized FGS, various macroblock syntax elements may be transmitted in the encoded bitstream to signal how each macroblock in the enhancement layer should be predicted by the decoder. The syntax elements may include information such as whether a macroblock is to be inter- or intra-predicted. If the macroblock is inter-predicted, additional information such as how a macroblock is partitioned, and the motion vector and reference frame index of each partition, should also be transmitted. If a macroblock is intra-predicted, either from the frame at the same temporal position, but in the base layer, or from the same frame in the same layer, additional information such as intra-prediction modes may be sent.

Transmission of syntax elements may be achieved in different ways. In one embodiment, for example, all of the syntax elements of a frame or a slice are transmitted before any texture information, which is the information related to the transform coefficients, is transmitted. In another embodiment, the syntax elements can be interleaved with the texture information. However, the encoded bitstream may still generally conform to the FGS format, avoiding the need to substantially redesign the structure and format of the encoding technique.

In an H.264 implementation, a macroblock can be in direct mode in a B slice, i.e., a bi-directional or bi-predictive coded slice that uses a past slice, a future slice, or both. A B slice may from part of a video frame or cover an entire video frame. When a macroblock is in direct mode in a B slice, the motion vectors and reference frame indices of this macroblock are derived from the information that is already coded. The information that is used for deriving the motion vectors and the reference frame indices is from the same frame and sometimes also from the reference frame. If a macroblock (MB) is in the spatial direct mode, the motion vector of each partition is derived from the motion vectors from the neighboring MBs. However, each derived motion vector may also be restricted by the motion vector of the co-located block in the reference frame. In the temporal direct mode, a motion vector may be derived from the motion vector of the co-located block in the reference frame based on the temporal relationship between the current frame and its reference frame.

One issue with the dependency of the derived motion vector on the information of the reference frame is that the reference frame may be truncated in decoder 26. As a result, the information that is available to encoder 20 may not be available to decoder 26. Incorrect reconstruction of motion vectors usually results in large error. In one embodiment, only the spatial direct mode is used if the enhancement layer is coded in B slice, and the derived motion vector is not restricted by any information from the reference frames. In other words, if the enhancement layer is coded in a bi-predictive (B) slice, decoder 26 applies only a modified spatial direct mode, which does not use any information form the reference frame.

Because the enhancement layer represents higher spatial resolution, in one embodiment, the significance map from the base layer may be upsampled before being used in the FGS coefficient coding process. In another embodiment, the significance map may be cleared before the FGS bitstream at the spatial enhancement layer is coded. In this case, no coefficients are coded as refinement coefficients in the FGS enhancement layer of increased spatial resolution. Hence, a significance map from the base layer is reset, and coefficients are decoded only as zero coefficients or nonzero significant coefficients with no refinement coefficients in one or more of the enhancement layers.

In some systems, it may be desirable to preserve the ability to encode discrete spatial enhancement layers, on a selective basis, in addition to FGS spatial enhancements layers. For example, complexity considerations may warrant selection of discrete spatial enhancement layers in some systems. In this case, system 10 may be configured to support compatibility with discrete spatial enhancement layers. Use of discrete spatial enhancement layer coding that may offer higher coding performance if the enhancement layer can be reliably delivered. Selection of discrete spatial enhancement layer coding may be signaled in the transmitted bitstream. For example, the bitstream may include signaling information that indicates whether discrete spatial enhancement layer coding or FGS spatial enhancement layer coding, as described herein, is supported for the bitstream. One example is to introduce a new flag into a scalable slice header to indicate whether FGS coding is used in the slice.

FIG. 15 is a diagram illustrating a luma DC block in a macroblock with an Intra 16 by 16 prediction mode. For an Intra_16×16 macroblock 92, luma DC coefficients may be Hadamard transformed. As shown in FIG. 15, if a macroblock is predicted using intra 16×16 mode, the luma prediction residuals are first transformed into 16 4×4 blocks, and the DC coefficients of the 16 blocks form another 4×4 block 94. This additional 4×4 block is referred to as the intra 16×16 DC block in this discussion. According to ITU-T H.264, the DC block is coded separately from the AC blocks. For ITU-T H.264, the additional implementation complexity of this separation is minimal. However, the impact of the implementation complexity is greater if it is separately coded in the FGS coder because of its particular design.

Therefore, in FGS coding, although an additional transform is performed on DC coefficients, the DC coefficients are not separately coded. This may not be a problem for traditional FGS, which only supports refinement to video of the same resolution. However, it could significantly affect the performance of spatial scalability via generalized FGS for some video content that favors intra_16×16 prediction. One way to make provide FGS spatial scalability without introducing excessive complexity is to code the intra 16×16 DC block in a way similar to how it is coded in the ITU-T H.264 base layer. For example, once the first coefficient of the intra 16×16 DC block is encountered, the entire block is coded before any other coefficients are coded.

This disclosure describes techniques for spatial scalability using generalized FGS coding. The use of a generalized FGS format allows the video coder to achieve continuous quality improvement across different spatial resolutions. As described in this disclosure, techniques for spatial scalability using generalized FGS coding may make use of several different schemes to support spatial scalability with acceptable performance and complexity. For example, the techniques may incorporate schemes to curb error propagation due to partial decoding, including leaky prediction for intra-coded macroblocks using a weighted average of the predictors formed with the enhancement layer neighboring pixels and upsampled base layer predictors, adaptive switching of the prediction source in partial decoding, and a special DC mode that stops spatial error propagation due to remaining drifting errors.

In some embodiments, a constraint may be enforced so that the prediction is not formed with the pixels from the same frame in the same layer, or other information derived from such pixels, to simplify the design. In addition, only the spatial direct mode may be used if the enhancement layer is coded in a B slice, and the derived motion vector is not restricted by any information from the reference frames. As a further feature, the significance map from the base layer picture can be upsampled and used in FGS coding of the enhancement layer residual to improve coding performance. Alternatively, the coefficients in the spatial enhancement layer can be coded with no refinement coefficients. Also, a special 1-bit syntax may be added to the scalable slice header to signal to the decoder whether the spatial scalability layer is using FGS coding or serves as a discrete spatial enhancement layers.

The techniques described in this disclosure may be implemented in hardware, software, firmware or any combination thereof. In particular, an encoder or decoder, as described herein, may be realized by any of a variety of hardware, software and firmware components. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some embodiments, the functionality described herein may be provided within dedicated software modules or hardware units configured for encoding and decoding, or incorporated in a combined video encoder-decoder (CODEC).

When implemented in software, the techniques may be realized in part by a computer readable medium comprising program code or instructions that, when executed by a processor, performs one or more of the functions described above. A computer-readable medium storing such program code or instructions may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any combination of such memory or storage media.

Various embodiments of the disclosure have been described. These and other embodiments are within the scope of the following claims.

The invention claimed is:

1. A video coding method comprising:
    decoding a fine granularity scalability (FGS) base layer to reconstruct a base layer video block defining video at a first spatial resolution;
    at least partially decoding one or more FGS enhancement layers to reconstruct an enhancement layer video block defining video at a second spatial resolution greater than the first spatial resolution;
    upsampling the reconstructed base layer video block to the second spatial resolution to form an upsampled base layer video block comprising a first prediction block for a current intra-coded video block of one of the FGS enhancement layers, wherein the first prediction block comprises an interpolated pixel resulting from the upsampling;
    forming a second prediction block from pixels in the enhancement layer video block that neighbor the current intra-coded video block in the one of the FGS enhancement layers, wherein the second prediction block comprises a pixel collocated with the interpolated pixel of the first prediction block; and
    predicting the current intra-coded video block based on a weighted sum of the first prediction block and the second prediction block, wherein predicting the current intra-coded video block comprises:
        applying a first weight to the interpolated pixel of the first prediction block to form a first weighted value;
        applying a second weight to the pixel of the second prediction block, collocated with the interpolated pixel of the first prediction block, to form a second weighted value; and
        adding the first weighted value and the second weighted value to produce a predicted value for a pixel of the current intra-coded video block collocated with the interpolated pixel of the first prediction block.

2. The method of claim 1, further comprising generating video at the second spatial resolution based on the decoded FGS base layer and the at least partially decoded FGS enhancement layers.

3. The method of claim 1, wherein the FGS base layer defines the video with a first quality level, and at least one of the FGS enhancement layers defines the video with a second quality level greater than the first quality level.

4. The method of claim 3, further comprising generating video at the second quality level based on the decoded FGS base layer and the at least partially decoded FGS enhancement layers.

5. The method of claim 3, further comprising generating video at the second spatial resolution based on the decoded FGS base layer and the at least partially decoded FGS enhancement layers, and generating the video at the second quality level based on the decoded FGS base layer and the at least partially decoded FGS enhancement layers.

6. The method of claim 1, further comprising predicting the intra-coded video block without using video information derived from the same frame in the same layer as the respective intra-coded video block.

7. The method of claim 1, further comprising predicting the intra-coded video block using only pixels from the base layer.

8. The method of claim 1, further comprising decoding a block in the FGS enhancement layer using a special DC mode in which a DC coefficient is predicted from a default value known to both an encoder and a decoder and AC coefficients are decoded without a prediction calculated from neighboring blocks.

9. The method of claim 1, further comprising applying only a modified spatial direct mode, which does not use information from a reference frame, to an enhancement layer if the enhancement layer is coded in a bi-predictive (B) slice.

10. The method of claim 1, further comprising upsampling a significance map from the base layer, and using the upsampled significance map to decode one or more of the enhancement layers.

11. The method of claim 1, further comprising resetting a significance map from the base layer, and decoding coefficients only as zero coefficients or nonzero significant coefficients with no refinement coefficients in one or more of the enhancement layers.

12. The method of claim 1, further comprising receiving a 1-bit syntax element with at least one of the enhancement layers to signal the use of FGS coding for spatial scalability.

13. A video coding device including a decoder that decodes a fine granularity scalability (FGS) base layer to reconstruct a base layer video block defining video at a first spatial resolution, at least partially decodes one or more FGS enhancement layers to reconstruct an enhancement layer video block defining video at a second spatial resolution greater than the first spatial resolution, upsamples the reconstructed base layer video block to the second spatial resolution to form an upsampled base layer video block comprising a first prediction block for a current intra-coded video block of one of the FGS enhancement layers, wherein the first prediction block comprises an interpolated pixel resulting from the upsampling, forms a second prediction block from pixels in the enhancement layer video block that neighbor the current intra-coded video block in the one of the FGS enhancement layers, wherein the second prediction block comprises a pixel collocated with the interpolated pixel of the first prediction block, and predicts the current intra-coded video block based on a weighted sum of the first prediction block and the second prediction block, wherein to predict the current intra-coded video block, the video coding device is configured to apply a first weight to the interpolated pixel of the first prediction block to form a first weighted value, apply a second weight to the pixel of the second prediction block, collocated with the interpolated pixel of the first prediction block, to form a second weighted value, and add the first weighted value and the second weighted value to produce a predicted value for a pixel of the current intra-coded video block collocated with the interpolated pixel of the first prediction block.

14. The device of claim 13, wherein the decoder generates video at the second spatial resolution based on the decoded FGS base layer and the at least partially decoded FGS enhancement layers.

15. The device of claim 13, wherein the FGS base layer defines the video with a first quality level, and at least one of the FGS enhancement layers defines the video with a second quality level greater than the first quality level.

16. The device of claim 15, wherein the decoder generates video at the second quality level based on the decoded FGS base layer and the at least partially decoded FGS enhancement layers.

17. The device of claim 15, wherein the decoder generates video at the second spatial resolution based on the decoded FGS base layer and the at least partially decoded FGS enhancement layers, and generates the video at the second quality level based on the decoded FGS base layer and the at least partially decoded FGS enhancement layers.

18. The device of claim 15, wherein the decoder predicts the intra-coded video block without using video information derived from the same frame in the same layer as the respective intra-coded video block.

19. The device of claim 13, wherein the decoder predicts the intra-coded video block using only pixels from the base layer.

20. The device of claim 13, wherein the decoder decodes a block in the FGS enhancement layer using a special DC mode in which a DC coefficient is predicted from a default value known to both an encoder and a decoder and AC coefficients are decoded without a prediction calculated from neighboring blocks.

21. The device of claim 13, wherein the decoder applies only a spatial direct mode, without using information from a reference frame, to an enhancement layer if the enhancement layer is coded in a bi-predictive (B) slice.

22. The device of claim 13, wherein the decoder upsamples a significance map from the base layer, and uses the upsampled significance map to decode one or more of the enhancement layers.

23. The device of claim 13, wherein the decoder resets a significance map from the base layer, and decodes coefficients only as zero coefficients or nonzero significant coefficients with no refinement coefficients in one or more of the enhancement layers.

24. The device of claim 13, wherein the decoder receives a 1-bit syntax element with at least one of the enhancement layers to signal the use of FGS coding for spatial scalability.

25. A non-transitory computer-readable medium comprising instructions that cause a processor to:
   decode a fine granularity scalability (FGS) base layer to reconstruct a base layer video block defining video at a first spatial resolution;
   at least partially decode one or more FGS enhancement layers to reconstruct an enhancement layer video block defining video at a second spatial resolution greater than or equal to the first spatial resolution;
   upsample the reconstructed base layer video block to the second spatial resolution to form an upsampled base layer video block comprising a first prediction block for a current intra-coded video block of one of the FGS enhancement layers, wherein the first prediction block comprises an interpolated pixel resulting from the upsampling;
   form a second prediction block from pixels in the enhancement layer video block that neighbor the current intra-coded video block in the one of the FGS enhancement layers, wherein the second prediction block comprises a pixel collocated with the interpolated pixel of the first prediction block; and
   predict the current intra-coded video block based on a weighted sum of the first prediction block and the second prediction block, wherein the instructions that cause the processor to predict the current intra-coded video block comprise instructions that cause the processor to:

apply a first weight to the interpolated pixel of the first prediction block to form a first weighted value;

apply a second weight to the pixel of the second prediction block, collocated with the interpolated pixel of the first prediction block, to form a second weighted value; and add the first weighted value and the second weighted value to produce a predicted value for a pixel of the current intra-coded video block collocated with the interpolated pixel of the first prediction block.

26. The non-transitory computer-readable medium of claim 25, wherein the second spatial resolution is greater than the first spatial resolution, the instructions further causing the processor to upsample the base layer video block, and wherein the first prediction block is formed from the upsampled base layer video block.

27. The non-transitory computer-readable medium of claim 26, wherein the instructions cause the processor to generate video at the second spatial resolution based on the decoded FGS base layer and the at least partially decoded FGS enhancement layers.

28. The non-transitory computer-readable medium of claim 27, wherein the FGS base layer defines the video with a first quality level, and at least one of the FGS enhancement layers defines the video with a second quality level greater than the first quality level.

29. The non-transitory computer-readable medium of claim 28, wherein the instructions cause the processor to generate video at the second quality level based on the decoded FGS base layer and the at least partially decoded FGS enhancement layers.

30. The non-transitory computer-readable medium of claim 28, wherein the instructions cause the processor to generate video at the second spatial resolution based on the decoded FGS base layer and the at least partially decoded FGS enhancement layers, and generate the video at the second quality level based on the decoded FGS base layer and the at least partially decoded FGS enhancement layers.

31. The non-transitory computer-readable medium of claim 26, wherein the instructions cause the processor to predict the intra-coded video block without using video information derived from the same frame in the same layer as the respective intra-coded video block.

32. The non-transitory computer-readable medium of claim 26, wherein the instructions cause the processor to predict the intra-coded video block using only pixels from the base layer.

33. The non-transitory computer-readable medium of claim 26, wherein the instructions cause the processor to decode a block in the FGS enhancement layer using a special DC mode in which a DC coefficient is predicted from a default value known to both an encoder and a decoder and AC coefficients are decoded without a prediction calculated from neighboring blocks.

34. The non-transitory computer-readable medium of claim 26, wherein the instructions cause the processor to apply only a spatial direct mode, without using information from a reference frame, to an enhancement layer if the enhancement layer is coded in a bi-predictive (B) slice.

35. The non-transitory computer-readable medium of claim 26, wherein the instructions cause the processor to upsample a significance map from the base layer, and use the upsampled significance map to decode one or more of the enhancement layers.

36. The non-transitory computer-readable medium of claim 25, wherein the instructions cause the processor to reset a significance map from the base layer, and decode coefficients only as zero coefficients or nonzero significant coefficients with no refinement coefficients in one or more of the enhancement layers.

37. The non-transitory computer-readable medium of claim 26, wherein the instructions cause the processor to receive a 1-bit syntax element with at least one of the enhancement layers to signal the use of FGS coding for spatial scalability.

* * * * *